US012511553B1

(12) United States Patent
Ghetti et al.

(10) Patent No.: US 12,511,553 B1
(45) Date of Patent: Dec. 30, 2025

(54) SYSTEMS AND PROCESSES FOR AUTOMATED COLLECTION OF DATA FROM THIRD-PARTY APPLICATIONS FOR PREDICTIVE AND ADAPTIVE UTILITY-BASED PERSONAL ASSISTANCE

(71) Applicant: Adapter Group, Inc., Atlanta, GA (US)

(72) Inventors: Adam Marcus Ghetti, Austin, TX (US); Aidan Ronald Crank, East Hampton, NY (US); Andrew James McGehee, Buda, TX (US); Anton Bozhidarov Kostov, Miami, FL (US); Dillon Joseph Ponzo, Little Silver, NJ (US); Remo Sandro Storni, Monte Sereno, CA (US); David Albert Bader, New York, NY (US)

(73) Assignee: Adapter Group, Inc., Atlanta, GA (US)

( * ) Notice: Subject to any disclaimer, the term of this patent is extended or adjusted under 35 U.S.C. 154(b) by 0 days.

(21) Appl. No.: 19/174,465

(22) Filed: Apr. 9, 2025

Related U.S. Application Data

(60) Provisional application No. 63/631,833, filed on Apr. 9, 2024.

(51) Int. Cl.
*G06N 5/022* (2023.01)
*G06F 40/30* (2020.01)

(52) U.S. Cl.
CPC ............ *G06N 5/022* (2013.01); *G06F 40/30* (2020.01)

(58) Field of Classification Search
CPC .............................. G06N 5/022; G06F 40/30
See application file for complete search history.

(56) References Cited

U.S. PATENT DOCUMENTS

| | | | |
|---|---|---|---|
| 2012/0016678 A1* | 1/2012 | Gruber | G06F 16/9537 704/E21.001 |
| 2019/0034780 A1* | 1/2019 | Marin | G06F 16/3329 |
| 2024/0061761 A1* | 2/2024 | Kim | G06F 16/33 |
| 2025/0217672 A1* | 7/2025 | Muro | G06N 5/022 |

FOREIGN PATENT DOCUMENTS

WO WO-2025128089 A1 * 6/2025 ............. G06F 40/30

* cited by examiner

*Primary Examiner* — Casey R. Garner
(74) *Attorney, Agent, or Firm* — Bradley Arant Boult Cummings LLP; Daniel E. Sineway, Esq.

(57) ABSTRACT

Disclosed are systems and processes for intelligent, adaptive, and utility-based personal assistance. The system can self-curate a knowledge graph based on communication artifacts and evidence received from a user, and from one or more user accounts at third-party applications. The system can extract linguistic content from the communication artifacts. The system can process the linguistic content to identify entities, entity properties, and intentions corresponding to the communication artifacts. The system can determine a contextual meaning of the linguistic content based on data corresponding to entities stored within the knowledge graph. The system can delegate artificial intelligent agents to perform actions on behalf of users based on the communication artifacts.

14 Claims, 12 Drawing Sheets

SYSTEMS AND PROCESSES FOR AUTOMATED COLLECTION OF DATA FROM THIRD-PARTY APPLICATIONS FOR PREDICTIVE AND ADAPTIVE UTILITY-BASED PERSONAL ASSISTANCE

CROSS-REFERENCE TO RELATED APPLICATIONS

This application is a Non-Provisional Patent Application of, and claims the benefit of and priority to, U.S. Provisional Patent Application No. 63/631,833, filed on Apr. 9, 2024, and entitled "SYSTEMS AND PROCESSES FOR AUTOMATED COLLECTION OF DATA FROM THIRD-PARTY APPLICATIONS FOR PREDICTIVE AND ADAPTIVE UTILITY-BASED PERSONAL ASSISTANCE," the disclosure of which is incorporated by reference as if the same were fully set forth herein.

TECHNICAL FIELD

The disclosed systems and processes relate generally to intelligent systems, and more specifically to systems and processes for automated collection of data from third-party applications for predictive and adaptive utility-based personal assistance.

BACKGROUND

Despite the proliferation and advancements in artificial intelligence (AI), machine learning (ML), large language models (LLMs), and the like, the utility for individual users provided by these algorithms, models, and data processing techniques is generally limited by the training data and searchable datasets available to them. While existing LLMs and other AI/ML models generally have access to virtually any data accessible via the internet, their current utility for individual users remains analogous to an enhanced internet search engine given personal user data is typically inaccessible to LLMs and other AI/ML models. Personal user data is inaccessible because personal user data is generally siloed within a plurality of disparate third-party applications and platforms. Historically, the companies controlling and operating these applications and platforms have monetized their user data and, thus, these companies have been unmotivated and disincentivized to share or expose their user data. Even if these companies were to share or expose their user data, the siloed structure of their data storage systems makes doing so technically challenging and computationally cumbersome. Moreover, many of these companies controlling and operating the applications and platforms are legally prohibited from exposing users' personal data without their express consent. Accordingly, there are a plurality of roadblocks and restrictions preventing LLMs and other AI/ML models from providing maximal utility to individual users. Therefore, there exists a long-felt but unmet need for systems and processes for automated collection of data from third-party applications for predictive and adaptive utility-based personal assistance

BRIEF SUMMARY OF DISCLOSURE

Briefly described, and according to one embodiment, aspects of the present disclosure generally relate to intelligent systems. In particular, and in various embodiments, the present disclosure relates to systems and processes for automated collection of data from third-party applications for predictive and adaptive utility-based personal assistance. In at least one example, the present disclosure discusses a machine learning and artificial intelligence supported microservices system configured to leverage a plurality of processing services and agents, that are dynamically linked (for example, at runtime), for processing communication artifacts and extracting information from the same.

In at least one example, the disclosed systems, methods, and processes solve at least the technical problem of siloed personal user data across various third-party applications and platforms (e.g., social media applications and platforms, email services, productivity applications, travel applications, data storage systems, etc.). For example, despite consumers generally having access and ownership rights to their data within third-party platform data silos, the process of retrieving (and subsequently processing) the data is cumbersome to the extent that many consumers fail to exercise their data rights at all. Thus, consumer data typically remains with the third-party applications and platforms with which the consumers interact, and those third-party applications typically monetize their customer data for the benefit of the third-party application owner (not the consumer/user). The disclosed systems, methods, and processes not only allow for automated collection of user data from third-party applications, but also allow for users to narrowly configure the scope of data to be collected and subsequently processed. Moreover, in response to collecting a user's data from one or more third-party applications, the disclosed systems and methods further train machine learning and artificial intelligence models for maximizing utility for the user. For example, the system can be configured to maximize utility for a user by considering the user's monetary resources, effort, time, and joy in each decision made.

The system can be configured to determine a deeper understanding of a user's life, based on corpus of the user's data, such that the user can offload or delegate decision-making to the system (in at least one non-limiting example, in the form of a personalized artificial intelligence (AI) assistant). In one embodiment, by analyzing historical data and utilizing self-optimizing components, the system can be operatively configured to generate a data structure that represents a comprehensive picture of a user's life context, preferences, and priorities. This data structure can be used to generate valuable insights, predict future actions, and automate decision-making in a way that aligns with the user's unique needs and desires.

In one embodiment, the system can include both external and internal computing components for receiving and processing user data. In one non-limiting example, external computing components can include user-facing applications, portals, third-party applications, etc., through which data retrieval can be enabled. In another non-limiting example, internal computing components can include backend components such as databases, processors, servers, software services/engines operatively configured to operate on the processors, etc. For example, a user can interface with a system graphical user interface (GUI) for indicating one or more third-party applications from which the user would like for the system to retrieve data. The user can also provide access credentials to the system for retrieving this data, and the user can indicate, with granularity of scope, the types of data the system can access and process. In this way, the system can be operatively configured to limit its data retrieval and processing to a narrowly tailored scope, or a user can consent to the system accessing all data. A user's granted scope of access can be expanded, contracted, or withdrawn at any time.

The system can retrieve bulk data downloads of user data from one or more third-party applications, and the system can furthermore train machine learning (ML) and artificial intelligence (AI) models on the user data. In general, the ML and AI models can be trained to predict an outcome that most closely aligns with what a particular user would do, in real life, in response to receiving a new piece of data/ evidence (for example, an email regarding a flight cancellation). Furthermore, the system can be operatively configured to include agent workflows that are programmed to act on behalf of the user in response to receiving a new piece of data. Referencing again the example about an email regarding a flight cancellation, in one embodiment, the system can include workflows that organize a plurality of discrete sub-workflows into a larger workflow to complete a particular task, such as rescheduling a flight. According to one aspect of the present disclosure, the sub-workflows can be self-organizing in that the system can determine, without active human interaction or oversight, and based on the information extracted from the new piece of data, user preferences, learned user behaviors, and other information, a response that most closely aligns with what the user would take in real life and furthermore an order in which sub-workflows should be executed for achieving the response. In at least one non-limiting example, the response can be realized by executing a plurality of linked sub-workflows, as discussed herein.

According to various aspects of the present disclosure, the system can become more accurate in its decision making over time as the system is exposed to additional user data. In various embodiments, the system can be configured to not only automate tasks, but also optimize decisions for the user's overall well-being by considering the true cost and true utility of each action. In one embodiment, optimizing decisions by considering the true cost and true utility of each action includes taking into account the user's available time and how an action might delete or replenish it (time bank), the user's financial resources and the cost associated with an action (money bank), the potential benefits lost by choosing one action over another (opportunity cost), and the user's network of relationships and how an action might affect them (social capital). The system can also consider the true cost and true utility of each action by considering a user's individual values and goals (priorities), a user's desired outcomes and motivations (intentions), the level of effort and cognitive resources required for an action (complexity), and the user's willingness to accept risk based on the specific situation and context (localized and contextually relevant risk tolerance).

In various embodiments, the system can be operatively configured to forecast into the future to determine the potential implications of a decision on a user's resources. This can include analyzing the likelihood of each resource being at a certain level in the future, given the user's current context and the potential impact of the decision.

The system can be operatively configured to perform technical decision analysis to achieve equilibrium through a rigorous focus on utility calculations and optimal ranking of any set of choices just in time. This can involve: 1) identifying all possible choices and their potential outcomes; 2) quantifying the impact of each outcome on the user's resource banks and individual factors (assigning weights to different factors based on the user's priorities and preferences); 3) calculating the true cost and true utility of each choice (considering both the immediate and forecasted future impact of the decision); and 4) ranking the choices based on their true utility (which allows the system to generate recommendations for options that are most likely to maximize the user's overall well-being).

For example, consider a scenario in which a user is deciding between two options for their weekend: 1) go on a hiking trip with friends (which would deplete the user's time and money banks but would replenish their social capital bank and contribute to their health and fitness goals); and 2) stay home and work on a personal project (which would conserve the user's time and money but might have a negative impact on their social capital and fitness goals). According to various aspects of the present disclosure, the system can be operatively configured to analyze both options, considering the user's current resource levels, priorities, and risk tolerance. In certain embodiments, the system can also forecast the potential future impact of each decision on the user's well-being. Based on this analysis, the system may recommend the hiking trip if it determines that the positive impact on the user's social capital and fitness goals outweighs the depletion of their time and money banks.

Consider another example in which a user is planning a large gathering, such as a wedding, retreat, or reunion. In this example, the system can be configured to consider the user preferences for venue types (e.g., outdoors/nature, restaurant, hotel, etc.), venue capacity, physical proximity to the user, average physical proximity to the guests, monetary budget, etc. According to various aspects of the present disclosure, the system can use the known user preferences to generate one or more venue recommendations, while also excluding from the recommendations any venues that include characteristics that the user is known to dislike (poor acoustics, limited parking, etc.). In particular embodiments, a user can provide his/her preferences to the system directly during an onboarding process, in response to being prompted by the system for periodic preference updates, voluntarily via one or more system GUIs, etc. In additional embodiments, the system can leverage machine learning and artificial intelligence models to learn and infer a user's preferences based on processed historical data (e.g., emails, calendar events, etc.) and how the user responds to newly received evidence corresponding to current or upcoming events. For example, consider a scenario in which a user's flight with a particular airline was cancelled; however, the airline automatically rebooked the user for another flight at a similar time. In an email from the airline to the user, the airline outlines an update to the user's itinerary, in which the user's seat has been changed from a window seat to an aisle seat as a result of the automatic rebooking. In this scenario, the system can infer that the user prefers airplane window seats over aisle or middle seats in response to the user manually modifying his/her rebooked seat to a window seat. In some embodiments, if the user did not manually modify his/her seat, the system can similarly infer that the user generally has no preference between aisle seats or middle seats. According to various aspects of the present disclosure, the system can be configured to determine whether a delta exists between data artifacts and furthermore whether that delta is indicative of a user preference.

The disclosed systems and processes can result in more informed decision-making. For example, by considering all relevant factors and forecasting future implications, the system can be operatively configured to help users make more informed and optimal decisions for their overall well-being.

Further, the system can result in enhanced personalized recommendations. For example, the analysis can be tailored to the user's individual priorities, preferences, and context, ensuring that recommendations are truly personalized and relevant.

Moreover, the system can result in increased efficiency and effectiveness. For example, by automating the decision analysis process, the system can help users save time and cognitive resources while making better choices.

By incorporating true cost and true utility analysis into its decision-making process, the system can not only to complete a user's tasks, but also optimize the user's overall well-being and life satisfaction.

In at least one non-limiting example, a user can interact with the disclosed system similar to a virtual agent or assistant. For example, a user can interact with the disclosed system via one or more GUIs, search bars, etc. In various embodiments, the disclosed systems can also be presented to the user as a "life compass." In a particular embodiment, the life compass can be a clock-faced GUI which displays events (or blocks of time) in the user's life which are understood to be most important to the user, the most deserving of the user's time and attention, etc. In one embodiment, to the extent that a user's day includes conflicting events or blocks of time, the system can display the events or blocks of time as multiple concentric circles (or partial circles), where the circles closest to the center of the clock face are understood to be the most important to the user.

In various embodiments, the present disclosure discusses a process including: receiving, at a processor, access credentials to a user's account at one or more third-party applications; receiving an indication of a scope of consent corresponding to account data receivable from the one or more third-party applications via the access credentials; receiving, from a particular third-party application of the one or more third-party applications, a data file comprising historical data belonging to the user and corresponding to the user's activity with the particular third-party application; processing the historical data to confirm that the historical data conforms with the scope of consent; training one or more machine learning models based on the historical data; receiving new user data from the particular third-party application, wherein the new user data corresponds to a future event; and determining, via the one or more machine learning models, a predicted user action based on a statistical relationship between the new user data and one or more vectors of the one or more machine learning models.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
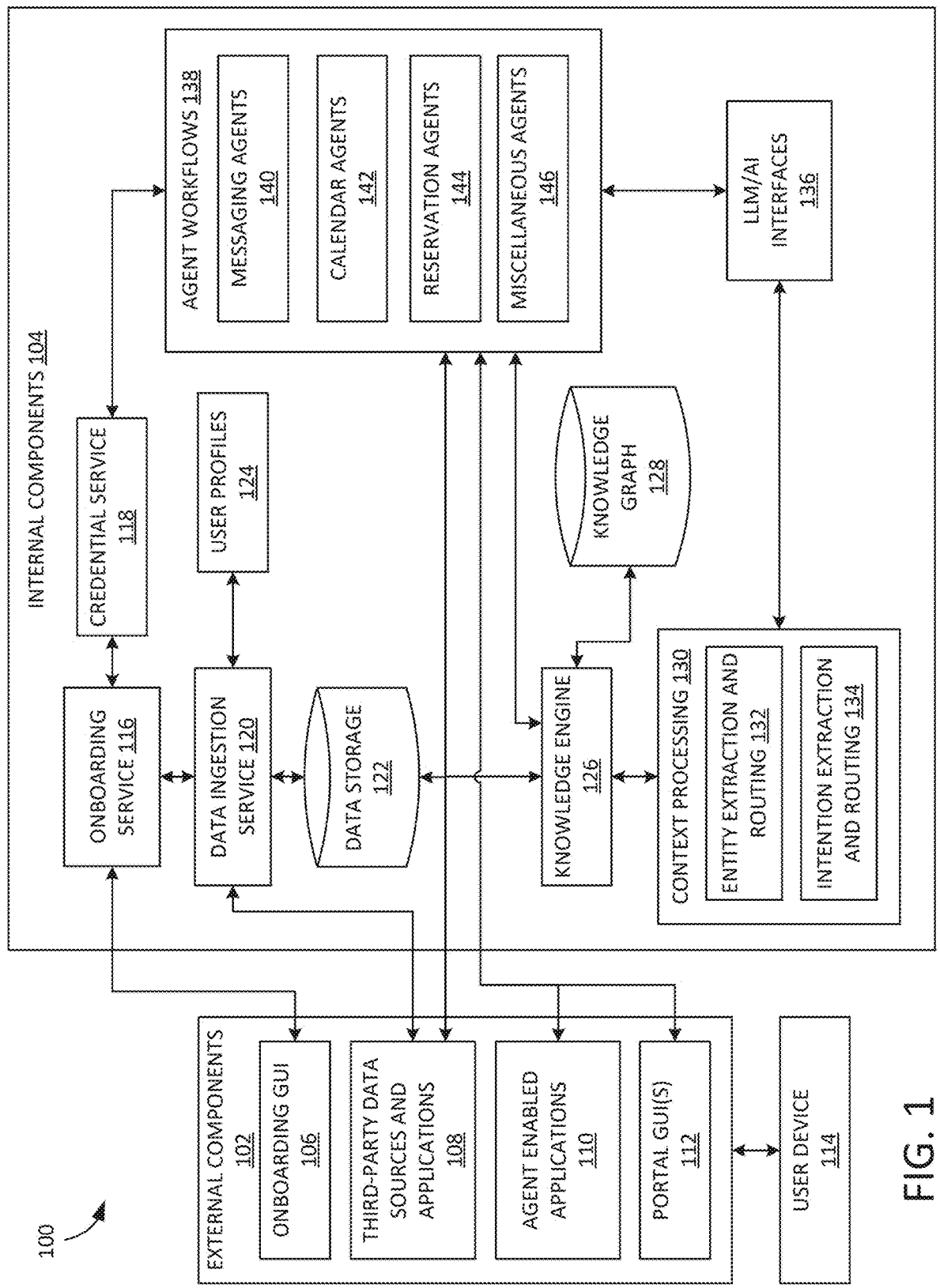
FIG. 1 shows a diagram of an example system architecture, according to one aspect of the present disclosure.

The disclosed technology generally relates to intelligent systems, and more specifically to systems and processes for automated collection of data from third-party applications for predictive and adaptive utility-based personal assistance. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims. All limitations of scope should be determined in accordance with and as expressed in the claims.

Overview

Aspects of the present disclosure generally relate to intelligent systems. In particular, and in various embodiments, the present disclosure relates to systems and processes for automated collection of data from third-party applications for predictive and adaptive utility-based personal assistance. In at least one example, the present disclosure discusses a machine learning and artificial intelligence supported micro-services system configured to leverage a plurality of processing services and agents, that are dynamically linked (for example, at runtime), for processing communication artifacts and extracting information from the same.

In at least one example, the disclosed systems, methods, and processes solve at least the technical problem of siloed personal user data across various third-party applications and platforms (e.g., social media applications and platforms, email services, productivity applications, travel applications, data storage systems, etc.). For example, despite consumers generally having access and ownership rights to their data within third-party platform data silos, the process of retrieving (and subsequently processing) the data is cumbersome to the extent that many consumers fail to exercise their data rights at all. Thus, consumer data typically remains with the third-party applications and platforms with which the consumers interact, and those third-party applications typically monetize their customer data for the benefit of the third-party application owner (not the consumer/user). The disclosed systems, methods, and processes not only allow for automated collection of user data from third-party applications, but also allow for users to narrowly configure the scope of data to be collected and subsequently processed. Moreover, in response to collecting a user's data from one or more third-party applications, the disclosed systems and methods further train machine learning and artificial intelligence models for maximizing utility for the user. For example, the system can be configured to maximize utility for a user by considering the user's monetary resources, effort, time, and joy in each decision made.

The system can be configured to determine a deeper understanding of a user's life, based on corpus of the user's data, such that the user can offload or delegate decision-making to the system (in at least one non-limiting example, in the form of a personalized artificial intelligence (AI) assistant). In one embodiment, by analyzing historical data and utilizing self-optimizing components, the system can be operatively configured to generate a data structure that represents a comprehensive picture of a user's life context, preferences, and priorities. This data structure can be used to generate valuable insights, predict future actions, and automate decision-making in a way that aligns with the user's unique needs and desires.

In one embodiment, the system can include both external and internal computing components for receiving and processing user data. In one non-limiting example, external computing components can include user-facing applications, portals, third-party applications, etc., through which data retrieval can be enabled. In another non-limiting example, internal computing components can include backend components such as databases, processors, servers, software services/engines operatively configured to operate on the processors, etc. For example, a user can interface with a system graphical user interface (GUI) for indicating one or more third-party applications from which the user would like for the system to retrieve data. The user can also provide access credentials to the system for retrieving this data, and the user can indicate, with granularity of scope, the types of data the system can access and process. In this way, the system can be operatively configured to limit its data retrieval and processing to a narrowly tailored scope, or a user can consent to the system accessing all data. A user's granted scope of access can be expanded, contracted, or withdrawn at any time.

The system can retrieve bulk data downloads of user data from one or more third-party applications, and the system can furthermore train machine learning (ML) and artificial intelligence (AI) models on the user data. In general, the ML and AI models can be trained to predict an outcome that most closely aligns with what a particular user would do, in real life, in response to receiving a new piece of data/evidence (for example, an email regarding a flight cancellation). Furthermore, the system can be operatively configured to include agent workflows that are programmed to act on behalf of the user in response to receiving a new piece of data. Referencing again the example about an email regarding a flight cancellation, in one embodiment, the system can include workflows that organize a plurality of discrete sub-workflows into a larger workflow to complete a particular task, such as rescheduling a flight. According to one aspect of the present disclosure, the sub-workflows can be self-organizing in that the system can determine, without active human interaction or oversight, and based on the information extracted from the new piece of data, user preferences, learned user behaviors, and other information, a response that most closely aligns with what the user would take in real life and furthermore an order in which sub-workflows should be executed for achieving the response. In at least one non-limiting example, the response can be realized by executing a plurality of linked sub-workflows, as discussed herein.

According to various aspects of the present disclosure, the system can become more accurate in its decision making over time as the system is exposed to additional user data. In various embodiments, the system can be configured to not only automate tasks, but also optimize decisions for the user's overall well-being by considering the true cost and true utility of each action. In one embodiment, optimizing decisions by considering the true cost and true utility of each action includes taking into account the user's available time and how an action might delete or replenish it (time bank), the user's financial resources and the cost associated with an action (money bank), the potential benefits lost by choosing one action over another (opportunity cost), and the user's network of relationships and how an action might affect them (social capital). The system can also consider the true cost and true utility of each action by considering a user's individual values and goals (priorities), a user's desired outcomes and motivations (intentions), the level of effort and cognitive resources required for an action (complexity), and the user's willingness to accept risk based on the specific situation and context (localized and contextually relevant risk tolerance).

In various embodiments, the system can be operatively configured to forecast into the future to determine the potential implications of a decision on a user's resources.

This can include analyzing the likelihood of each resource being at a certain level in the future, given the user's current context and the potential impact of the decision.

The system can be operatively configured to perform technical decision analysis to achieve equilibrium through a rigorous focus on utility calculations and optimal ranking of any set of choices just in time. This can involve: 1) identifying all possible choices and their potential outcomes; 2) quantifying the impact of each outcome on the user's resource banks and individual factors (assigning weights to different factors based on the user's priorities and preferences); 3) calculating the true cost and true utility of each choice (considering both the immediate and forecasted future impact of the decision); and 4) ranking the choices based on their true utility (which allows the system to generate recommendations for options that are most likely to maximize the user's overall well-being).

For example, consider a scenario in which a user is deciding between two options for their weekend: 1) go on a hiking trip with friends (which would deplete the user's time and money banks but would replenish their social capital bank and contribute to their health and fitness goals); and 2) stay home and work on a personal project (which would conserve the user's time and money but might have a negative impact on their social capital and fitness goals).

According to various aspects of the present disclosure, the system can be operatively configured to analyze both options, considering the user's current resource levels, priorities, and risk tolerance. In certain embodiments, the system can also forecast the potential future impact of each decision on the user's well-being. Based on this analysis, the system may recommend the hiking trip if it determines that the positive impact on the user's social capital and fitness goals outweighs the depletion of their time and money banks.

Consider another example in which a user is planning a large gathering, such as a wedding, retreat, or reunion. In this example, the system can be configured to consider the user preferences for venue types (e.g., outdoors/nature, restaurant, hotel, etc.), venue capacity, physical proximity to the user, average physical proximity to the guests, monetary budget, etc. According to various aspects of the present disclosure, the system can use the known user preferences to generate one or more venue recommendations, while also excluding from the recommendations any venues that include characteristics that the user is known to dislike (poor acoustics, limited parking, etc.). In particular embodiments, a user can provide his/her preferences to the system directly during an onboarding process, in response to being prompted by the system for periodic preference updates, voluntarily via one or more system GUIs, etc. In additional embodiments, the system can leverage machine learning and artificial intelligence models to learn and infer a user's preferences based on processed historical data (e.g., emails, calendar events, etc.) and how the user responds to newly received evidence corresponding to current or upcoming events. For example, consider a scenario in which a user's flight with a particular airline was cancelled; however, the airline automatically rebooked the user for another flight at a similar time. In an email from the airline to the user, the airline outlines an update to the user's itinerary, in which the user's seat has been changed from a window seat to an aisle seat as a result of the automatic rebooking. In this scenario, the system can infer that the user prefers airplane window seats over aisle or middle seats in response to the user manually modifying his/her rebooked seat to a window seat. In some embodiments, if the user did not manually modify his/her seat, the system can similarly infer that the user generally has no preference between aisle seats or middle seats. According to various aspects of the present disclosure, the system can be configured to determine whether a delta exists between data artifacts and furthermore whether that delta is indicative of a user preference.

The disclosed systems and processes can result in more informed decision-making. For example, by considering all relevant factors and forecasting future implications, the system can be operatively configured to help users make more informed and optimal decisions for their overall well-being.

Further, the system can result in enhanced personalized recommendations. For example, the analysis can be tailored to the user's individual priorities, preferences, and context, ensuring that recommendations are truly personalized and relevant.

Moreover, the system can result in increased efficiency and effectiveness. For example, by automating the decision analysis process, the system can help users save time and cognitive resources while making better choices.

By incorporating true cost and true utility analysis into its decision-making process, the system can not only to complete a user's tasks, but also optimize the user's overall well-being and life satisfaction.

In at least one non-limiting example, a user can interact with the disclosed system similar to a virtual agent or assistant. For example, a user can interact with the disclosed system via one or more GUIs, search bars, etc. In various embodiments, the disclosed systems can also be presented to the user as a "life compass." In a particular embodiment, the life compass can be a clock-faced GUI which displays events (or blocks of time) in the user's life which are understood to be most important to the user, the most deserving of the user's time and attention, etc. In one embodiment, to the extent that a user's day includes conflicting events or blocks of time, the system can display the events or blocks of time as multiple concentric circles (or partial circles), where the circles closest to the center of the clock face are understood to be the most important to the user.

In various embodiments, the present disclosure discusses a process including: receiving, at a processor, access credentials to a user's account at one or more third-party applications; receiving an indication of a scope of consent corresponding to account data receivable from the one or more third-party applications via the access credentials; receiving, from a particular third-party application of the one or more third-party applications, a data file comprising historical data belonging to the user and corresponding to the user's activity with the particular third-party application; processing the historical data to confirm that the historical data conforms with the scope of consent; training one or more machine learning models based on the historical data; receiving new user data from the particular third-party application, wherein the new user data corresponds to a future event; and determining, via the one or more machine learning models, a predicted user action based on a statistical relationship between the new user data and one or more vectors of the one or more machine learning models.

Example Embodiments

Referring now to the figures, for the purposes of example and explanation of the fundamental processes and components of the disclosed systems, methods, and processes, reference is made to FIG. 1, which shows a diagram of an example system architecture 100. At a high-level, the system architecture 100 includes external components 102 and internal components 104. In various embodiments, the external components 102 can be user-facing components and interfaces, for example, such as an onboarding graphical user interface (GUI) 106, third-party data sources and applications 108, agent enabled applications 110, portal GUIs 112, etc. According to various aspects of the present disclosure, a system user, through his/her user device 114, can interact with one or more of the external components 102 which can in turn initiate processing via one or more of the internal components 104. In one example, the internal components 104 can process data objects received from the external components (e.g., emails, calendar invites, text queries, personal user requests, etc.) and can generate intelligent responses or actions in response to the data objects.

In a particular embodiment, the onboarding GUI 106 can be a user-facing web-based portal through which the user can establish an account or profile with the system. For example, the onboarding GUI 106 can present the user with an interface for providing personal details, information, preferences, etc. The onboarding GUI 106 can present the user with an interface for selecting or identifying one or more third-party applications 108 to which the system can connect, particular categories or scopes of data which the user would like for the system to access, etc. In various embodiments, the onboarding GUI 106 can prompt users to provide login credentials for gaining access to the one or more third-party applications 108.

In one embodiment, the onboarding GUI 106 can be supported by the onboarding service 116 located within the internal components 104. The onboarding service 116 can be a processor (or micro-service) configured to receive and process the user inputs, as provided via the onboarding GUI 106. Moreover, the onboarding service 116 can be operatively connected to a credential service 118. In various embodiments, the credential service 118 can store and maintain the login credentials provided by users via the onboarding GUI 106. In at least one example, the credential service 118 can be operatively configured to manage credentials in accordance with the OAuth 2.0 protocol. In at least one embodiment, the credential service 118 can be operatively configured to store user access credentials for particular third-party applications in connection with an indication of the narrowly tailored scope of access which the system is granted for data within the particular third-party applications. In certain embodiments, the user credentials and corresponding scopes of access can be tokenized and stored within the credential service 118. According to various aspects of the present disclosure, the credential service can periodically prompt system users to confirm, or re-consent, to the access privileges and capabilities granted to the system. The system can prompt a user to confirm, or re-consent to, the user's granted access privileges in response to the system performing an action on behalf of the user, prior to retrieving user data from a third-party application, after a predetermined amount of time (1 day, 7 days, 30 days, etc.), etc.

According to various aspects of the present disclosure, and in response to a user selecting one or more third-party applications 108 to which the system can obtain access, the data ingestion service 120 can establish secure connections with each consented-to application for receiving a bulk data download/upload from the applications. In one embodiment, and prior to conducting bulk data downloads/uploads from any application, the data ingestion service 120 can receive user data preferences from the onboarding service 116 as well as user access credentials from the credential service 118. According to various aspects of the present disclosure, the data ingestion service 120 can be operatively configured to integrate with third-party application data export services such as Google Takeout™, Amazon® upload, Ticketmaster®, OpenAI™, Comcast®/Xfinity®, Stack Overflow®, LinkedIn®, or the like.

According to various aspects of the present disclosure, system users can provide dynamic and ongoing consent, permissions, and preferences to the system for configuring third-party application data access permissions, automatic decision making (agency), etc. For example, the system can be operatively configured to periodically prompt users to confirm (via generating a notification for users to acknowledge) the scopes of consented-to data to which the system can access in one or more third-party applications, which actions the system can take on behalf of the user, etc. In one embodiment, the system can be operatively configured to prompt a user to confirm, for example, whether the user would like for the system to execute a task which the system predicted would be beneficial to the user (such as prompting the user with "Do you want to book this alternative flight given your prior flight is delayed?"). In various embodiments, the system can be configured to prompt a user for confirmation prior to executing any action on behalf of the user; however, the system can be configured to adapt to the user's responses to such prompts and gradually reduce the number of confirmation prompts sent to the user as the system learns the user's consent preferences. In at least one non-limiting example, the system can be configured to automatically perform an action, such as scheduling an alternative flight, without first prompting a user to provide express approval for the action.

In various embodiments, depending on a file size corresponding to received bulk data, the data ingestion service 120 can pass the entire file into the system, or the service 120 can chunk the file and route all chunks to the data storage 122. The data ingestion service 120 can "sniff" the file (e.g., content sniffing, media type sniffing, multipurpose internet mail extensions sniffing, etc.) to determine the type and file size, which can be used to determine whether the file type and size can be handled in a single upload (based on constraints of buffer and/or average network stability). For example, the data ingestion service 120 can sniff the contents of a byte stream by attempting to identify file signatures or other file characteristics which can indicate file type and/or size. In some embodiments, larger files may need to be chunked and routed into the system via a byte stream. In at least one non-limiting example, the system can also be authenticated for accessing third-party platform API's (for example, such as an OAuth2 flow for retrieving an access token).

The bulk data uploads can be stored in the data storage 122. The data storage 122 can be one or more databases operatively configured to store various types of data belonging to a plurality of users. In certain embodiments, the data storage 122 can be blob storage, bucket cloud storage, or the like. The system can maintain user profiles 124 for each user that registers with the system, and the user profiles can include information such as personal information, applications to which the user has granted the system access, and types of information the user has limited the system from processing (e.g., legal documents, healthcare records, etc.).

The agent enabled applications 110 included within the external components can be applications such as calendar applications, email or messaging applications, reservation applications, or the like. As will be discussed in greater detail below, the agent enabled applications 110 can be operatively connected to one or more agent workflows 138, which can programmatically arrange a plurality of microservices for completing a particular task (for example, creating a reservation).

The portal GUI(s) 112 included within the external components 102 can be one or more interfaces through which the user can interact with the system. For example, a portal GUI 112 can include a graphical representation of a user's life schedule, where events or blocks of time are organized in concentric circles around a clock dial. According to various aspects of the present disclosure, the events or blocks of time can be layered such that events that are closer to the center of the clock dial are understood by the system to be of greater importance to the user. However, it should be understood that the present disclosure is not intended to limit, and does not limit, the system to using any particular GUI, combination of GUIs, or general interfaces, as GUIs other than those explicitly discussed herein are capable of being implemented. In various embodiments, the system can be operatively configured to implement any appropriate type of interface, GUI, or the like.

Continuing with the discussion of FIG. 1, included within the internal components 104 is a knowledge engine 126. In one example, the knowledge engine 126 can be one or more processors. In various embodiments, the knowledge engine 126 can be a micro-services processor, a processor, a server, etc., configured to perform a plurality of functions corresponding to data ingestion (bulk data uploads/downloads), event streaming (processing receiving new evidence data), entity extraction, intention routing, etc. According to various aspects of the present disclosure, the knowledge engine 126 can generate, update, and maintain, a knowledge graph 128. In at least one non-limiting example, the knowledge engine 126 can be a software configuration running on one or more processors. In another non-limiting example, the knowledge engine 126 can be a particular service within a micro-services architecture which can include a plurality of services.

In a particular embodiment, the knowledge engine 126 can be operatively configured to perform context processing 130. According to various aspects of the present disclosure, context processing 130 can include various subprocesses such as entity extraction and routing 132, as well as intention extraction and routing 134. As will be discussed in greater detail throughout the present disclosure, the knowledge engine 126 can be operatively configured to identify entities (e.g., people, places, things, etc.) within evidence received by the system, and to furthermore determine the purpose, meaning, or intention corresponding to the evidence. In one embodiment, an entity can be a person, place, thing, organization, concept, situation, etc., that is present and recognizable within a piece of evidence. According to various aspects of the present disclosure, the system can determine that a piece of evidence includes any number of entities (1, 2, 3, 5, 10, 50, etc.), and evidence processed by the system generally includes at least two entities. In one example, an email between two people attempting to coordinate a hotel reservation can include at least three entities—the two people and the hotel. In at least one non-limiting example, the hotel reservation itself can represent a fourth entity within the email, wherein the hotel and the email correspondents are each separately linked to the reservation entity. Moreover, the system can identify one or more intentions within evidence. In particular embodiments, intentions can be a purpose, motivation, or outcome corresponding to a piece of evidence (such as reserving a hotel room). Based on the determined entities and intentions within a single piece of evidence received by the system, the context processing 130 can route the entity and intention information to one or more agent workflows 138 for initiating one or more actions (if appropriate).

In one embodiment, the entity extraction and routing 132 service identifies and extracts entities (e.g., people, places, events) from user data. In various embodiments, the service 132 enriches the understanding of the user's life context and enables more nuanced automation. According to various aspects of the present disclosure, the entity extraction and routing service 132 can include entity recognition models that are continuously trained on newly received data to improve accuracy (which allows the system to identify and extract entities with greater precision over time). Furthermore, relationship identifications between entities are continuously refined for better automation decisions (for example, the system might learn that certain people are important to the user and prioritize tasks related to them). Accordingly, in at least one non-limiting example, the entity extraction and routing service 132 can be considered to be self-optimizing in that the service continuously improves upon prior iterations of the service.

In particular embodiments, the intention extraction and routing service 134 analyzes extracted data to determine intentions and predict future actions that will become relevant to this data object or its owner. In at least one embodiment, the intention extraction and routing service 134 forms the basis for proactive and personalized automation. In various embodiments, self-optimizing improvements corresponding to the intention extraction and routing service 134 include continuously refining machine learning models and other machine intelligence techniques for intention prediction for increased accuracy (which allows the system to better anticipate the user's needs and desires), and the routing algorithms being configured to adapt to user behavior and preferences for better task allocation. For example, the system might learn that the user prefers to handle certain tasks themselves and route other tasks to automated agents.

In one example, context processing 130 can be operatively connected to one or more large language models (LLMs) or artificial intelligence (AI) interfaces 136. In various embodiments, the LLM/AI interfaces 136 can include current and future models provided by OpenAI™ (GPT-2, GPT-3, GPT-3.5, GPT-4, GPT-4.5, GPT-4o, GPT-5, o3-mini, etc.), Google® (Bard™/Gemini™, Vertex AI™, etc.), Meta® (Llama™ 2, 3, 4, etc.), xAI (Grok), and the like. The LLM/AI interfaces 136 can also include self-hosted LLM interfaces. In at least one non-limiting example, the LLM/AI interfaces 136 can include custom models. Further, in a non-limiting example, the custom models can be proprietary models (generated by the system) and/or third-party models, where the models are preconfigured and specifically trained for a specific use case (such as identifying context within an email). According to various aspects of the present disclosure, the system can train one or more LLMs or AI models on stored user data. In response to receiving new user evidence/data, the system can generate a vector representation of the evidence/data (the vector including deconstructed entity and intention information) in embedding/vector space for determining related entities and/or intentions.

In various embodiments, the internal components 104 include various agent workflows 138. According to various aspects of the present disclosure, the agent workflows 138 can include a plurality of micro-processes that can be dynamically combined to reach a desired outcome. In one embodiment, the agent workflows 138 can include messaging agents 140, calendar agents 142, reservation agents 144, and other miscellaneous agents 146 (for example, learned agents).

In various embodiments, each agent workflow can be operatively configured to perform tasks in a specific domain (e.g., travel booking, scheduling, budgeting, market research, message routing, etc.). In particular embodiments, the agent workflows 138 can self-organize into dynamic teams to achieve user-defined adapted outcomes (e.g., plan a vacation, organize a meeting, help support a recurring date night, etc.). In at least one example, a self-optimizing improvement corresponding to the agent workflows is embodied by agents continuously learning and adapting to optimize team composition (which ensures that the most appropriate and efficient team of agents is assembled for each adapted outcome). In certain embodiments, individual agents can learn and improve their performance based on experience and feedback (which allows the system to continuously improve its automation capabilities).

For example, suppose the user sets an adapted outcome of "Plan a weekend getaway to the mountains." The agent framework can assemble a team including:

1: a travel agent, which specializes in finding travel deals and booking flights and accommodations. The travel agent can also leverage its knowledge of the user's preferences and budget to find the best options.

2: an activity agent, which can identify and recommend activities and attractions at the destination. The activity agent can personalize its suggestions based on the user's interests and past activities.

3: a budget agent, which can monitor expenses and ensure the trip stays within the user's budget. The budget agent can dynamically adjust the itinerary or suggest alternative options if necessary.

4: a logistics agent, which can handle transportation arrangements and other logistical details. The logistics agent can ensure a smooth and hassle-free travel experience for the user.

According to various aspects of the present disclosure, the team of agents can be configured to work together seamlessly to plan and execute the perfect mountain getaway, taking into account the user's preferences, budget, and other relevant factors.

In various embodiments, the agent workflows can include coordination agents which can be operatively configured to utilize advanced optimization techniques to identify the best possible time windows for activities involving multiple individuals or entities (which ensures that activities are scheduled and executed in a way that optimizes alignment and satisfaction for all involved parties).

In one embodiment, at least one self-optimizing improvement of the coordination agents is that optimization algorithms are continuously refined to consider new factors and improve efficiency. This can include incorporating machine learning techniques to learn from past scheduling successes and failures. In certain embodiments, data gathering and analysis methods adapt to user behavior and preferences. For example, the system can be operatively configured to learn that certain individuals are more flexible with their schedules and prioritize their availability accordingly.

Example scenarios outlining the coordination agents and optimal time window discovery are outlined below:

1. Scheduling a meeting: a coordination agent can identify the best time for a meeting between multiple individuals, taking into account their individual schedules, preferences, and even travel time.

2. Planning a family vacation: a coordination agent can find the optimal time window for a family vacation, considering factors like school holidays, work schedules, travel preferences, and budget constraints.

3. Organizing a sports game: a coordination agent can determine the best time for a game between two teams, taking into account player availability, travel time, field availability, and even weather forecasts.

In various embodiments, all decisions and actions of the disclosed agents are fully transparent and explainable. For example, users can see which agents are involved in achieving a specific outcome, understand the rationale behind their actions, and even intervene if necessary. In particular embodiments, this can ensure that users remain in control of the automation process and can trust the system's decisions.

Figure 2:
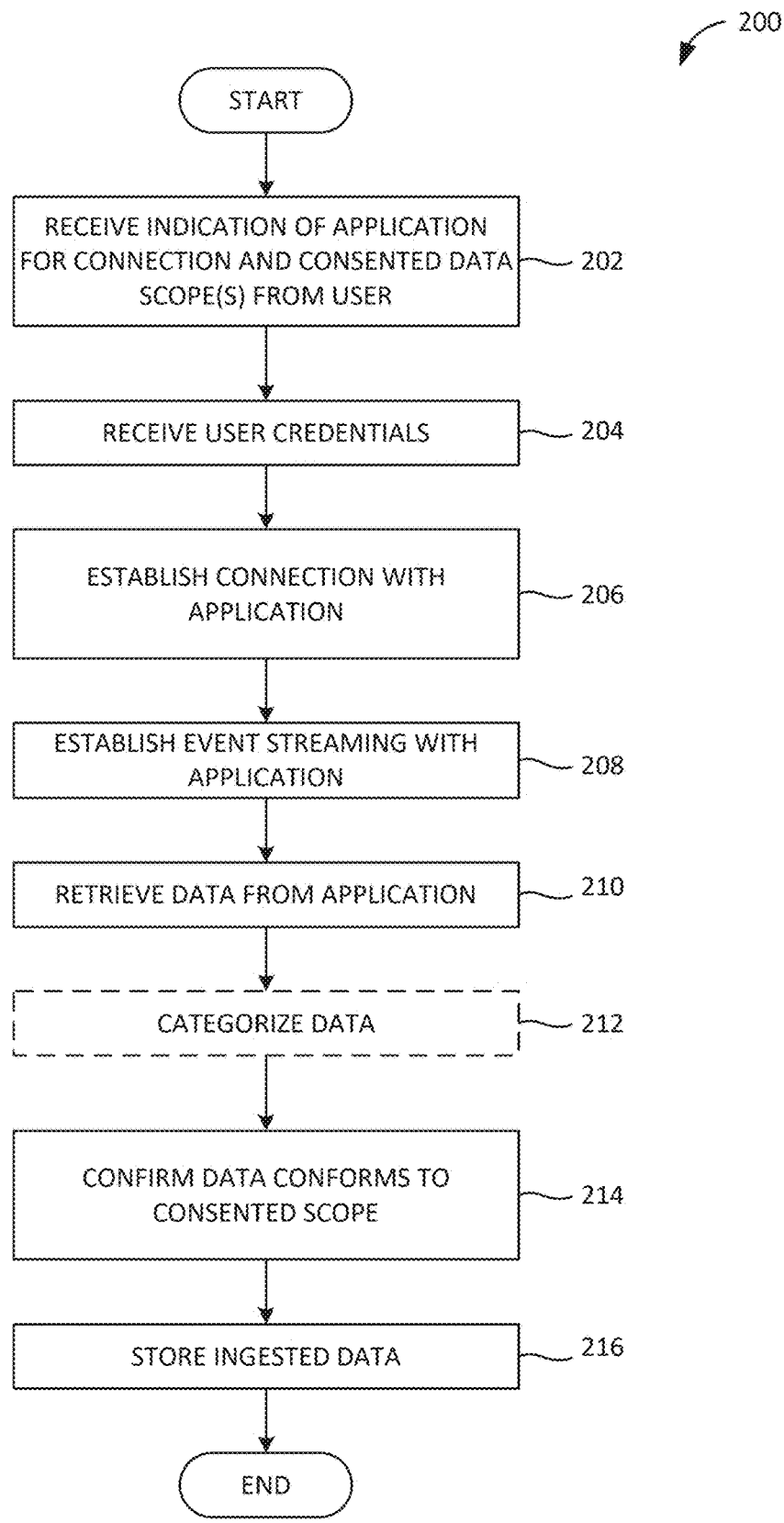
FIG. 2 shows a flowchart of an example data application connection and data ingestion process, according to one aspect of the present disclosure.

In one example, FIG. 2 shows an application connection and data ingestion process 200. In various embodiments, the process 200 describes the steps by which the system receives privileged access to user accounts at third-party applications, retrieves user data from those applications, performs privacy checks on the data to validate that the system is receiving the appropriate data, and furthermore stores the data for subsequent processing.

In various embodiments, the process 200 begins at step 202 where the system receives an indication of the one or more third-party applications to which the user is granting access, as well as an indication of the scope of data which the user is granting the system access to. According to various aspects of the present disclosure, this indication can be received during an initial user onboarding (for example, via the user interacting with the onboarding GUI 106). The user can also grant access to new applications, or expand or contract the scope of access, at any point in time. For example, a user can grant access to an email application (e.g., Gmail, Outlook, etc.) and consent to the system receiving all inbox and sent emails from the past two years; however, the user can later retract consent by excluding the system from retaining knowledge about emails relating to legal matters. In this scenario, connections or edges between nodes/entities in the knowledge graph can be deleted.

At step 204, the system can receive the user credentials corresponding to the one or more third-party applications to which the user is granting access. In various embodiments, the system can receive the user's actual login credentials (e.g., username and password) for a third-party application, or the system can receive a tokenized version of access credentials, such as OAuth 2.0 access tokens. According to various aspects of the present disclosure, the user's credentials can be stored, managed, refreshed, updated, and maintained within the system's credential service 118.

In one embodiment, at step 206 the system can establish a connection with a third-party application to which the user has granted access. According to various aspects of the present disclosure, the system can establish a connection with the third-party application by transmitting an API request/call to the application. In various embodiments, the API request/call can include the user's access credentials and/or an indication of the scope of data to which the user has granted consent.

In various embodiments, at step 208, the system can establish event streaming with the connected third-party application. In at least one example, establishing event streaming can include establishing a webhook with the connection third-party application. In one embodiment, webhooks established with a third-party application allow for the system to receive notifications regarding modifications, mutations, or updates to the third-party application. For example, in response to the system establishing a webhook with a user's email account, the system can receive a notification if a new email is received. In general, a webhook can allow for the system to receive an indication that the third-party application has a version of certain data that is newer than data previously uploaded by the system. In certain embodiments, establishing event streaming with the third-party application can include establishing a publish-subscribe (pub/sub) pattern. In at least one example, the pub/sub pattern or service can be operatively configured to handle real-time notifications from connected applications and sensors (which ensures the system's understanding of the user's context is always up-to-date). The pub/sub pattern or service can enable real-time automation adjustments based on the latest information. In certain embodiments, the pub/sub service can include real-time data processing algorithms that are optimized for faster and more accurate responses. This can involve using techniques like stream processing and distributed computing to handle high volumes of data efficiently. In particular embodiments, event pattern recognition adapts to identify new triggers for automated actions. For example, the system can be operatively configured to learn that when the user receives a specific type of email notification, it should trigger a specific agent team configuration.

In various embodiments, at step 210 the system retrieves the user's data from the third-party application. In particular embodiments, the system can receive and temporarily store the data in volatile memory, for enhanced security, until the system verifies that only user-consented data was received. In at least one embodiment, the user's data can be transmitted over a TLS encrypted channel.

In various embodiments, at step 212, the system can categorize the user data. In certain embodiments, step 212 can be an optional step. For example, step 212 can be an optional step if the third-party application pre-categorizes the data. In various embodiments, third-party applications such as applications from the Google suite generally pre-categorize data, and thus additional categorization may not be required. According to various aspects of the present disclosure, categorizing and classifying data can include parsing the data for certain words or phrases that indicate a particular semantic context. In a non-limiting example, categorizing and classifying data can include parsing the data for certain source indicators, such as a sender's email address on an email. In at least one example, the system can be configured to confirm and/or re-categorize data items that have already been categorized. For example, the system can be configured to receive pre-categorized data items from one or more Google applications, and the system can confirm whether the pre-categorized data items are appropriately labeled/tagged. The system can re-categorize the data items by applying new data labels and organizing the re-categorized data items into new data buckets. The system can be operatively configured to confirm the labeling of pre-categorized data by applying one or more machine learning models (such as large language models) to the pre-categorized data to determine one or more intentions for each evidence artifact within the data, and furthermore comparing the pre-categorized data labels/tags against the one or more intentions. In at least one non-limiting example, the system can apply one or more machine learning models to categorize raw data (such as unlabeled or uncategorized user data).

At step 214, the system can confirm that the received user data conforms to the user's consented-to scope. In various embodiments, step 214 is an additional data validation and verification process to ensure that the system does not ingest data to which the user explicitly prohibited access. In certain embodiments, the system can provide the data to a LLM or artificial intelligence model for determining the context or general scope of the data. In at least one non-limiting example, a user can configure the system (via user preferences) such that the system is prohibited from ingesting data related to legal communications and legal services. Data related to legal communications and legal services might be prohibited, for example, because such communications include sensitive or confidential information, and the user may determine that such communications should remain private and available only to the user. In another example, a user may also explicitly prohibit data including communications sent to, or received from, a healthcare provider, a healthcare lab or testing facility, etc., from being included in ingested data (given healthcare information is generally sensitive and confidential personal information). Pre-categorized data from applications like those included in the Google suite generally do not indicate (for example, via labels/tags) whether certain data items correspond to legal communications or legal services, or healthcare related communications, and thus those data items may not be labeled appropriately when received by the system. Accordingly, the system can be configured to process and analyze the data item's context to confirm that the data item does not represent a prohibited data item. In certain examples, such as where a data item corresponds to an email communication, and where the email communication incudes a document attachment (such as an invoice for legal services rendered, healthcare lab testing results, etc.), the document attachment can also be analyzed to determine whether the document attachment represents a prohibited data item (for example, such as an invoice detailing legal services rendered, an invoice for healthcare lab testing, etc.). Moreover, if the system determines that the data item represents a prohibited data item, the system can expunge, delete, or otherwise remove the prohibited data item from the system such that the prohibited data item does not proceed to subsequent processing steps.

Continuing with step 214, and in another example, a user can grant the system permission to ingest data related to travel, while also prohibiting the system from ingesting data related to medical information. In this example, the system can receive a pre-categorized data item corresponding to a user's travel history (e.g., Uber receipts, Lyft receipts, etc.), and the system can be further configured to analyze an origin and/or destination associated with the travel data to determine whether the context of the data items is medically suggestive (such as if an origin and/or destination for the user's travel history correspond to cancer treatment centers or other medical facilities). If the system determines that the data item represents a prohibited data item, the system can expunge, delete, or otherwise remove the prohibited data item from the system such that the prohibited data item does not proceed to subsequent processing steps.

At step 216, the system can store the ingested data. According to various aspects of the present disclosure, the system can store the ingested data in non-volatile memory for long-term storage, such as a knowledge base. In one example, the system can store the ingested data in the data storage 122.

Figure 3:
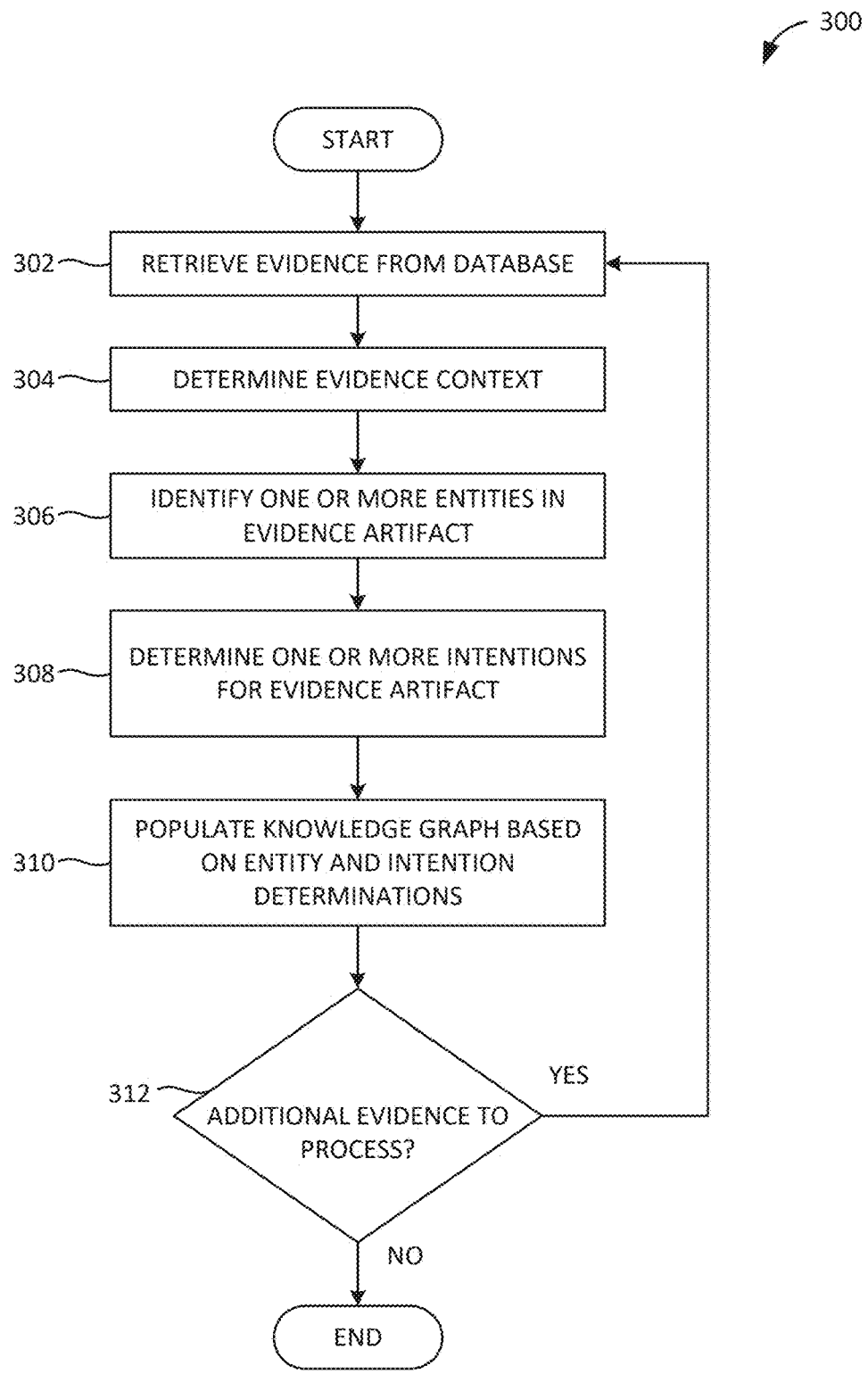
FIG. 3 shows a flowchart of an example knowledge database population process, according to one aspect of the present disclosure.

Turning now to FIG. 3, a flowchart of an example knowledge database population process 300 is shown, according to one embodiment. In one embodiment, the process 300 illustrates a process by which the system receives data from external sources (e.g., third-party applications, publicly available records, user inputs, etc.), extracts context from that data, and generates a living database, or knowledge graph, that represents the system's understanding of its received data. More specifically, the system can generate and populate a knowledge graph to represent the system's understanding of the user, the user's preferences, and the user's relationships to other entities known by the system. In this way, the system can establish both individual user contexts as well as a broader global context. In one example, the system generates a knowledge graph for representing, and understanding, how entities are related. For example, each entity in the knowledge graph can be represented as a node, and connections or edges between nodes can represent a particular relationship between the nodes. In various embodiments, entities in the knowledge graph can include characteristics, preferences, or properties, and the knowledge graph can further be configured to include weights for those characteristics, preferences, properties, etc., where the weights can be a numerical value indicative of priority or importance corresponding to its respective characteristic/preference/property. For example, if a user's favorite cuisine is Italian food, the knowledge graph can include a stronger weight for Italian food as compared to other types of cuisine. Accordingly, if the system is prompted for recommending a restaurant in a new city for the user to try, the system can recommend an Italian restaurant given the system's understanding of the user. It should be understood from the discussion herein that despite weights being described above as numerical values, it is not intended by this disclosure to limit in any way how weights are implemented. For example, weights can also include complex weights (such that the weights include complex numbers), nominal weights, ordinal weights, or any appropriate weighting format.

In one embodiment, the process 300 can begin at step 302 at which the system retrieves stored evidence data for processing. In various embodiments, the evidence data can be retrieved from a database such as the data storage 122. For the purposes of example, an item or artifact of evidence can be a single email from a user's ingested email inbox. In other examples, the evidence can be a calendar invite from a user's ingested calendar application data, a text message, etc.

At step 304, the system determines the evidence context. In various embodiments, determining the evidence context is a high-level processing step for determining the relevance of the evidence to the user. In at least one embodiment, the system can provide the evidence to an LLM for determining the evidence context. The LLM can determine, based on the text included in the evidence, a likely category or classification corresponding to the evidence. In certain embodiments, the evidence can be pre-categorized.

In one embodiment, at step 306 the system can identify one or more entities in the evidence artifact. According to various aspects of the present disclosure, the system can perform one or more machine learning or artificial intelligence techniques on the evidence to determine one or more entities in the artifact. For example, the system can use regular expression models (tuned for certain types of evidence) for determining entities within the evidence. The system can also use an optimized semantic analysis machine for determining one or more entities in the artifact. In one example, the system can use various natural language processing techniques, such as named entity recognition (NER) models, for identifying and extracting entities from evidence artifacts. In particular examples, the system can leverage heuristics, based on domain knowledge, for identifying and extracting entities from evidence artifacts. The system can use transformer-based architectures and/or encoder-only architectures for determining one or more entities in the artifact. In at least one example, the system can use one or more ontologies for determining whether context within an evidence artifact constitutes an entity already stored within the knowledge graph, where the one or more ontologies can define a plurality of data elements that are representative of a particular entity. In a non-limiting example, processing the ingested data with one or more ontologies can enhance extraction accuracy and effectiveness by providing one or more predefined data structures that correspond to entities and entity relationships, thus reducing extracted entity false positives.

At step 308, in various embodiments, the system can determine one or more intentions for the evidence artifact. In at least one example, an intention corresponding to a particular evidence artifact can be a meaning or purpose for the evidence. For example, an evidence artifact can be an email from an airline, while the intention for the email can be a confirmation regarding booking the flight or a notification regarding a seat change. In at least one example, the system can determine one or more intentions for an evidence artifact, such as an email, based on the sender and/or recipient of the email. For example, an email sent from Amazon.com can be determined to include a shopping-related intention, an email from Delta.com can be determines to include a travel-related intention, etc. In particular embodiments, the system can also use regular expression models, semantic analysis models, large logic models, transformer-based and/or encoder-only models for determining one or more intentions included in an evidence artifact. In certain embodiments, the system can recursively determine more granular intentions (or sub-intentions) for a particular evidence artifact. For example, the system can determine that a high-level (or primary) intention for a calendar invite message is to schedule a meeting; however, the system can further determine that sub-intentions corresponding to the calendar invite are to schedule an in-person meeting, or to schedule an in-person meeting at a specific location with certain technology capabilities and food options. In particular examples, processing an evidence artifact can include generating a directed graph, where contextual aspects of a particular evidence artifact (e.g., intentions) influence a subsequent processing step (e.g., a next node in the directed graph) for determining one or more additional aspects. The system can route evidence through a refinement pipeline for determining the most granular intention corresponding to that evidence.

In particular embodiments, at step 310, the system can populate a knowledge graph based on the extracted entity and intention determinations. In certain embodiments, the system can also populate a knowledge database with deconstructed entity and intention information. In at least one example, the system can populate a vector with extracted entity and intention information for each evidence artifact, and the system can use the vector to modify the knowledge graph and/or search for where an associated node or relation may exist within the knowledge graph. In various embodiments, each entity identified by the system can be represented in the knowledge graph. Accordingly, the knowledge graph can not only represent a user's life context, but can also represent a global world context. For example, the system can extract a hotel reservation entity from a particular evidence artifact and the entity can be linked to, or associated with, an existing global entity for the hotel. In at least one example, the knowledge graph and/or knowledge database can be continuously adapted and modified as new data is processed by the system. In various embodiments, the knowledge base can furthermore be used for providing LLMs and ML/AI models with vectors and geometries for guiding future predictions in response to the system receiving new evidence. In particular embodiments, the knowledge base can not only guide LLMs and ML/AI models, but it can also provide constraints (based on known user preferences and behavior) which eliminates hallucinations and results in more efficient recommendations for the user.

Accordingly, at step 312, the system determines whether there is additional evidence from the bulk upload to be processed. If additional evidence remains to be processed, the process 300 can return to step 302 where the system retrieves another evidence artifact from the database. If no additional data remains for processing, the process 300 can end.

Figure 4:
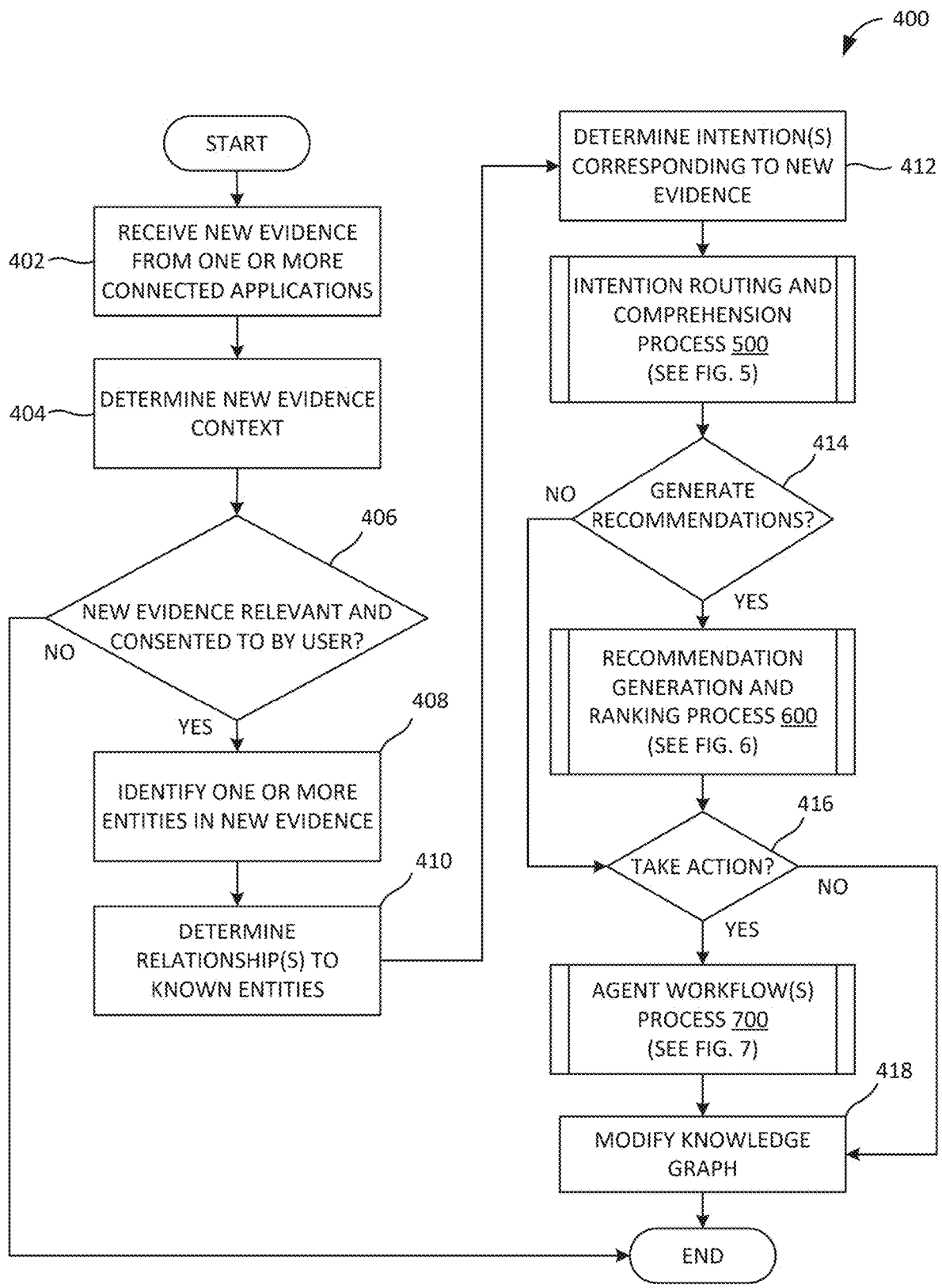
FIG. 4 shows a flowchart of an example real-time artifact processing process, according to one aspect of the present disclosure.

In one embodiment, FIG. 4 shows a flowchart of an example real-time artifact processing process 400. According to various aspects of the present disclosure, the system can be operatively configured to receive real-time data streams from one or more connected third-party application data sources. For example, the system can be operatively configured to establish webhooks with one or more third-party applications for receiving data from the third-party applications. In at least one example, the system can be operatively configured to receive communication artifacts from system users via emails, text messages, voice messages, etc. In other embodiments, the system can be operatively configured to establish publish-subscribe (pub/sub) patterns or services with one or more third-party applications. In response to receiving new data or evidence/artifacts, the system can process the new data or evidence/artifacts and determine a best next step to perform (if any) based on the new data or evidence.

In one embodiment, the process 400 begins at step 402, where the system receives new evidence (e.g., a communication artifact) from at least one of the one or more connected data sources. In at least one example, the connected data source from which the new evidence is received can be a third-party application. In other examples, a user can provide data directly to the system, for example, via providing the system with a text prompt or command. In certain embodiments, and as discussed immediately above, the new evidence can be received via a webhook, a pub/sub pattern, or another similar service for receiving updated or modified data from a source/publisher. In various embodiments, the system can receive new evidence, in real-time, as the evidence becomes available. In other embodiments, the system can receive the evidence according to a predetermined schedule or time interval. For example, the system can query (or receive updates from) a connected email application for any new emails every minute, five minutes, 15 minutes, 30 minutes, etc.

At step 404, the system can determine the new evidence context. In various embodiments, the system can determine the new evidence context based on a category, type, or classification label attributed to the evidence. For example, if the new evidence is an email from a user's Gmail® account, evidence/artifact type can be an email, and the email can be labeled with a scope identifier such as travel, purchase, work, marketing, etc. In particular embodiments, if the evidence does not include a category or classification label, the system can route/transmit the evidence (or a data object representative of the evidence) to an LLM for determining a category or classification for the evidence. In at least one example, the system can process the evidence via one or more natural language processing algorithms for determining the evidence context. The system can extract metadata such as timestamps, senders, file types, etc., from the evidence for determining the evidence context and/or type. In certain embodiments, the system can execute one or more heuristics for determining the evidence context. In one or more examples, the heuristics can include named entity recognition (NER) heuristics for identifying references to people, places, things, objects, etc., that are known to the system (e.g., stored in the knowledge graph). One or more heuristics (such as NER) can be used for preprocessing the received communication artifacts/evidence by identifying only the most relevant linguistic content (for example, text data or other language-related content relating to entities) from the communication artifact to process. In general, understanding a category or classification for the evidence allows for the system to determine the evidence's context and how the system should react to the newly received evidence (if at all) for providing the most utility to the user.

In one embodiment, at step 406 the system can determine if the newly received evidence is relevant to the user and/or consented to by the user. For example, consider a scenario in which the system receives an indication of a new calendar invite (based on the system's connection to a third-party calendar application) for a meeting with the user's lawyers, and the user has explicitly prohibited the system from processing artifacts from the user data which relate to legal matters. In this scenario, while the evidence is likely relevant to the user (a calendar invite), the system can determine based on the evidence context and user preferences that the evidence should not continue through the processing pipeline given the user expressly prohibited the system from processing legal information. In a separate example, consider a scenario in which the new evidence is an email from an airline requesting feedback regarding a recent flight. The system can identify the email sender, flight confirmation number, and general context of the email and determine that while the user has consented to the system processing travel-related evidence, this particular email is likely not relevant to the user given the user has already taken the flight and generally does not leave post-flight reviews. However, if the email was instead regarding a change to a flight itinerary, the system can determine that this new evidence is both relevant to the user and the type of evidence for which the system has received user consent. In at least one example, the system can process the evidence via a policy engine (e.g., a plurality of rules, logic, filters, predicates, etc.) for determining that the evidence is consented to by the user. Accordingly, if the newly received evidence is both relevant to the user and falls within the user's scope of consent, the evidence can be ingested into the system and the process 400 can proceed to the step 408. However, if the system determines that the evidence is either not relevant to the user or falls outside the user's scope of consent, the process 400 can end.

In various embodiments, at step 408, the system can identify one or more entities included in the newly received evidence. In particular embodiments, the processing involved at step 408 can resemble the processing from step 306 discussed above in association with the description of FIG. 3. In certain embodiments, and based on the new evidence context as determined at step 404, the system can leverage one or more processing techniques that are optimized or tailored for extracting data from the new evidence type. In one or more examples, the system can be configured to identify one or more entities in the new evidence (also referred to herein as communication artifacts) by processing the evidence via one or more large language models (LLMs). The LLMs can be specifically configured, or trained, according to domain specific data sets. For example, if at the step 404 the system determines that the new evidence corresponds to a travel receipt, the system can further process the evidence with an LLM trained on flight-related data (e.g., flight purchase receipts or confirmation emails, flight reminders, cancellation notifications, delay notifications, etc.). The one or more LLMs can be operatively configured to process text data. The one or more LLMs can be operatively configured for performing natural language processing. In certain examples, and based on the evidence metadata, the system can determine a processing priority corresponding to the evidence. For example, the system can prioritize processing evidence which includes metadata indicative of known entities, such as emails from known reservation providers (e.g., Resy®, Delta®, etc.) or other content indicative of time sensitivity (such as a calendar event occurring within a predetermined time threshold (e.g., 1 hour, 2 hours, 12 hours, 24 hours, etc.)). In one or more examples, at step 408 the system can process the new evidence, and the evidence metadata, via heuristics, LLMs, and other machine learning techniques, for determining whether to perform a deeper analysis of the evidence (for example, if one or more entities are not recognized within the evidence). The system can perform the deeper processing at step 410.

At step 410, the system can determine relationships between the one or more entities included in the newly received evidence and any known entities within the knowledge graph. According to various aspects of the present disclosure, the system can determine these relationships by populating the deconstructed entity information into a vector and furthermore representing the vector in an embedding space. The system can compare the vector to any other known vectors (relating to known entities) within the embedding space. In one example, any known vector that is nearby (within a predetermined distance threshold) the vector can be determined to be strongly related to the vector. For example, the system can calculate a cosine similarity between a vector embedding of an entity identified within the new evidence and a vector embedding of a known entity within the knowledge graph. In various embodiments, the system can determine a cosine similarity between the vectors. In various embodiments, a cosine similarity (also referred to as a similarity score or metric) of greater than 0.8 can indicate that a vector embedding of an entity identified within the new evidence is similar, or statistically related, to a vector embedding of a known entity within the knowledge graph. In at least one embodiment, the predetermined distance threshold can be a cosine similarity of about 0.8. In various embodiments, the predetermined distance threshold can be a cosine similarity of about 0.8, 0.85, 0.9, 0.95, etc., based on the system's configurations and based on user context from the user's knowledge graph. In various embodiments, the system can compare vectors, or vector embeddings, by determining Euclidean distances, dot products, Manhattan distances, approximate nearest neighbors (ANNs), etc. In at least one example, the system can perform a deep content analysis using one or more LLMs. A deep content analysis can include further processing the evidence content via fine-tuned LLMs and comparing extracted text data to entities stored within the user's knowledge graph. In one embodiment, the system can process a structured version of the extracted metadata via the policy engine for further determining, or confirming, whether the evidence is permissible (e.g., the evidence includes permissible text data). In one embodiment, permissible text data can be text data that does not correspond to content identified by the user as being prohibited (for example, sensitive health data, confidential legal data, etc.).

Continuing with step 410, determining relationships to know entities can include determining whether an entity identified with new evidence already exists within the user's knowledge graph (for example, to prevent adding duplicate entities to a knowledge graph). In one example, determining whether an entity already exists within a user's knowledge graph includes performing entity reidentification (ReID). In various embodiments, entity ReID can include extracting an entity from evidence and determining all relevant attributes corresponding to the entity (based on the knowledge graph ontology). Depending on the determined attributes, the system can perform a direct ReID process, an indirect ReID process, or a just in time (JIT ReID) process.

In various embodiments, the system can perform a direct ReID process when an entity extracted from new evidence includes all attributes from the entity as modeled within the knowledge graph ontology, and where the modeled entity includes explicit unique identifiers. In this example, the system can search the user's knowledge graph for an entity that matches the extracted entity. If a match does not exist, the system can add the extracted entity into the knowledge graph. If a match does exist, the system can supersede the most recent piece of evidence with the newly received evidence (for example, via an upsert merge operation).

The system can perform an indirect ReID process, for example, when an entity extracted from new evidence does not include all attributes from its corresponding entity as modeled within the knowledge graph ontology, or where the modeled entity does not include explicit unique identifiers. In this example, the system can generate composite identifiers based on entity type (including, for example, fuzzy or range matching on names, dates, and other attributes). The system can search the user's knowledge graph with one or more queries including the composite identifiers. If a match does not exist, the system can add the extracted entity into the knowledge graph. If a match does exist, the system can supersede the most recent piece of evidence with the newly received evidence (for example, via an upsert merge operation).

The system can perform a JIT ReID process when an entity extracted from new evidence cannot immediately be determined to already be present within the knowledge graph. For example, the extracted entity may correspond to an entity type within a knowledge graph ontology, although the extracted entity may not include attributes as indicated within the ontology. In this example, the system can add the extracted entity to the knowledge graph. Further, the system can be configured to, via a recurring job, or via a user query invoking the entity type: search and retrieve all relevant and modeled entities that are not superseded; provide the retrieved entities and contextual guidance to one or more LLMs for determining possible duplicates based on relevant context, and furthermore for resolving and deduplicating those in real time for processing. In one example, the system can link the extracted entities to fully modeled entity versions. In certain embodiments, the system can receive user feedback for confirmation.

In one embodiment, at step 412, the system can determine one or more intentions corresponding to the new evidence. In particular embodiments, the processing involved at step 412 can resemble the processing from step 308 discussed above in association with the description of FIG. 3. In at least one example, the system can determine intention(s) corresponding to the new evidence via one or more natural language processing techniques.

In response to determining intention(s) corresponding to the new evidence, the system can be configured to route, forward, or transmit, the new evidence (and/or the text data from the new evidence) to the intention routing and comprehension process 500. In one example, and as will be described in greater detail below in connection with the discussion of FIG. 5, the system can be configured to generate a contextual understanding of the received evidence based not only on the text data extracted from the evidence, but also based on entities within the knowledge graph that are determined to be related to the evidence.

At step 414, and in response to the system executing the process 500, the system can determine whether to generate a recommendation based on the received evidence. In one example, determining whether to generate a recommendation based on the received evidence can be dependent upon step 516 from the process 500 discussed below. In various embodiments, step 516 from the process 500 includes (optionally) initiating an action corresponding to the new evidence. Accordingly, at step 414 of the process 400, the system determines whether the action to be initiated (from step 516 of the process 500) corresponds to generating a recommendation based on the evidence. If the system determines that a recommendation should not be generated, the process 400 can proceed to the step 416, where the system further determines if any other action should be taken. If, at step 414, the system determines that one or more recommendations should be generated, the process 400 can proceed to the recommendation generation and ranking process 600.

As will be described in greater detail below in connection with the recommendation generation and ranking process 600 of FIG. 6, the system can be operatively configured to generate a preferred outcome based on the newly received evidence and stored user context. According to various aspects of the present disclosure, the system can determine a predicted or preferred outcome by populating a vector with the entity and intention information and representing the vector in an embedding space, where any other vectors in close mathematical proximity (for example, having a cosine similarity greater than 0.8) within the embedding space may be strongly related. The system can also leverage LLMs and other ML/AI models, guided/scoped based on the constraints of a user's known preferences and behaviors as stored in the knowledge graph and/or knowledge base, to generate outcome predictions. In at least one embodiment, the system can populate extracted preference vectors, which can be applied to a set of potential decisions to determine an optimal result. In certain embodiments, the system can query the knowledge graph for a cached layer of user preferences. In at least one example, the cached layer of user preferences can be stored as an entity within the knowledge graph with one or more edge relationships to an entity corresponding to the user.

According to various aspects of the present disclosure, at step 416 the system determines if an action should be taken in response to the recommendation generation and ranking process 600, and/or in response to the intention routing and comprehension process 500 (if the system determined that a recommendation should not be generated at step 414). In one example, an action can include booking a reservation on behalf of the user. In another example, an action can include automatically modifying a preexisting reservation (or other activity or time commitment) for the user. For example, consider a scenario in which a user's flight was delayed such that the user will no longer be able to timely arrive to an in-person meeting in the destination city. In response to receiving evidence corresponding to this delay (for example, an email from the airline), the system can determine that an entirely new flight should be booked so that the user can timely arrive at the in-person meeting. The system can determine whether to take an action based on user-provided preferences or based on learned user behaviors in response to similar scenarios. In some embodiments, the system can determine that the appropriate action is simply to notify the user regarding the new evidence and to request for additional instructions for resolving the issue. At step 416, if the system determines that no action should be taken, the process 400 can proceed to step 418. In various embodiments, if the system determines at step 416 to perform an action, the process 400 can proceed to the agent workflow process/subroutine 700. In various embodiments, and as will be discussed in greater detail immediately below, the subroutine 700 is a process by which the system determines a pipeline of agent workflows for completing an action on behalf of the user.

At step 418, the system can modify the knowledge graph. According to various aspects of the present disclosure, modifying the knowledge graph includes adding or removing connections/edges between entities/nodes, strengthening or weakening weighted characteristics/properties corresponding to entities, adding entirely new entities to the knowledge graph, etc. For example, if the user did not reschedule his/her flight in response to receiving a cancellation email, the knowledge graph can be adjusted such that the system will not automatically reschedule subsequently cancelled flights under similar circumstances. In various embodiments, if the system booked a new flight for the user, an entity corresponding to the new flight can be added to the user's local knowledge graph.

Figure 5:
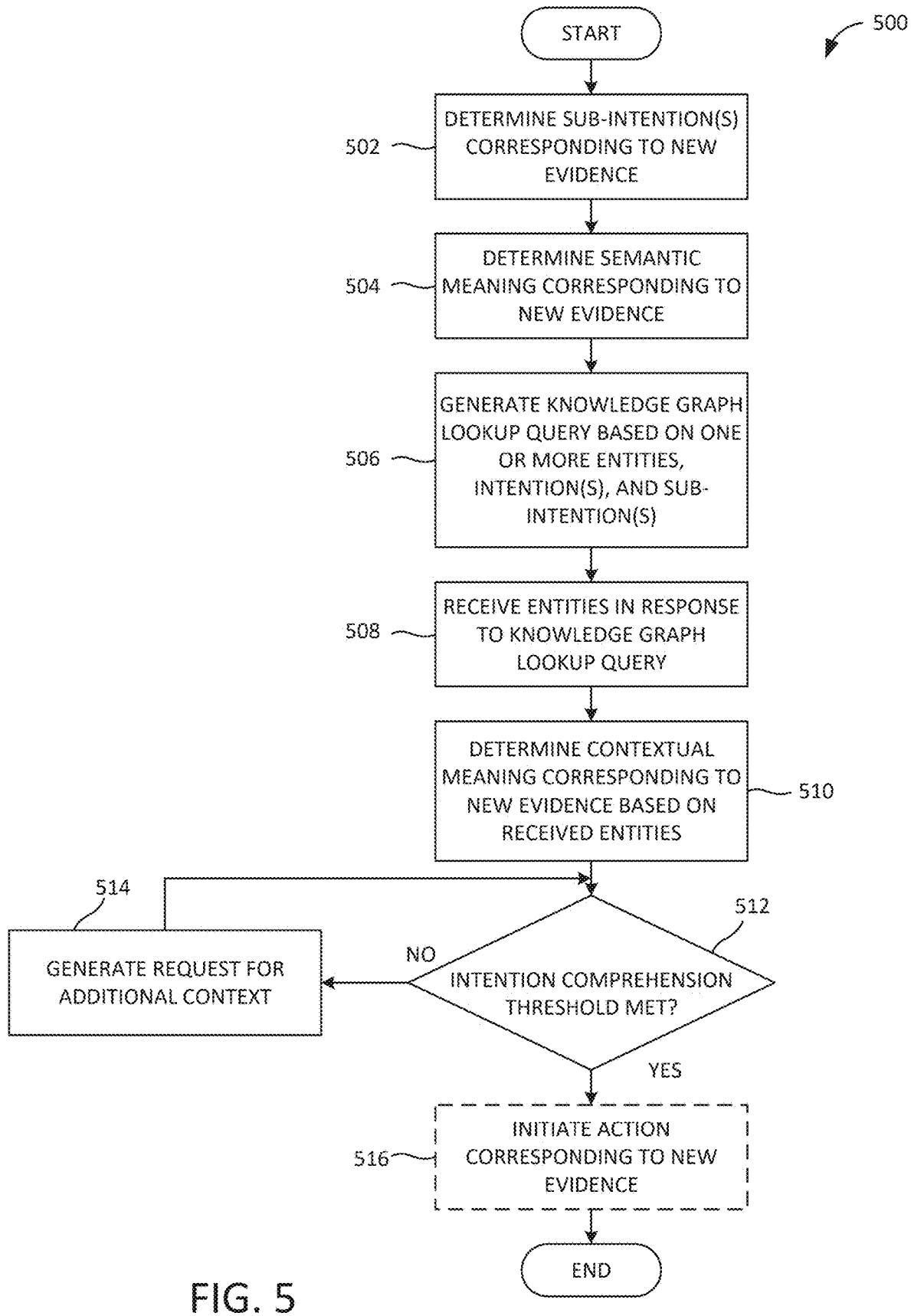
FIG. 5 shows a flowchart of an example intention routing and comprehension process, according to one aspect of the present disclosure.

FIG. 5 is a flowchart of an example intention routing and comprehension process 500. In one embodiment, and in response to the system determining one or more initial intentions corresponding to the newly received evidence (discussed above in connection with step 412 of the process 400), the system can route the new evidence to one or more preconfigured processing workflows, pipelines, etc., for further refining the system's comprehension (or statistically measured understanding) of the evidence. In certain examples, the system can determine an initial intention, or a primary intention, for a received evidence/communication artifact. The system can determine to which of the one or more preconfigured processing workflows to route the evidence, for further processing, based on the one or more entities identified within the new evidence and/or based on the one or more intentions. In one or more examples, to which of the one or more preconfigured processing workflows an artifact is routed can be based on a determined domain and/or type corresponding to the evidence. For example, the system can include a preconfigured processing workflow for further processing of a travel related confirmation email, where "travel" is the domain and "email" is the type. In another example, the system can include a preconfigured processing workflow for further processing of a meeting invitation received from a connected third-party calendar application. The one or more preconfigured processing workflows to which newly received evidence is routed can leverage LLM's for processing the evidence. The LLM's can be fine-tuned for processing the evidence, such that their weights are adjusted according to domain specific datasets and granular, task-specific, processing objectives.

In one example, the process 500 can begin at step 502, where the system determines or identifies one or more (if any) sub-intentions corresponding to the new evidence. For example, the system can determine that a high-level (or primary) intention for a calendar invite message is to schedule a meeting. The system can further determine that sub-intentions corresponding to the calendar invite are to schedule an in-person meeting, or to schedule an in-person meeting at a specific location with certain technology capabilities and food options. The system can determine one or more intentions corresponding to the new evidence via natural language processing algorithms, such as named entity recognition (NER) algorithms.

At step 504, the system can determine a semantic meaning corresponding to the new evidence. In one embodiment, determining a semantic meaning corresponding to the new evidence includes performing one or more natural language processing (NLP) algorithms on the new evidence. The system can determine a semantic meaning corresponding to the new evidence via techniques such as attention mechanisms, tokenization and embeddings, and other NLP techniques.

At step 506, the system can generate a knowledge graph lookup query. In one example, the knowledge graph lookup query can be based on the one or more entities, intentions, and sub-intentions identified within the new evidence. In one example, the system can generate a knowledge graph lookup query for receiving data from one or more entities stored within the knowledge graph that may relate to the one or more entities, intentions, and sub intentions, identified within the new evidence. For example, if the system determines that the semantic meaning of a particular communication artifact processed by the system is to schedule a dinner with a particular person on a specific date in the future, the system can generate a knowledge graph lookup query to receive (and subsequently reason over) one or more entities that may include relevant information regarding the user's locality (on the specific date in the future). The system can generate the knowledge graph lookup query based on the semantic meaning determined at step 504. In one example, generating a knowledge graph lookup query includes determining available parameters for the knowledge graph lookup query based on an ontology corresponding to the knowledge graph. In various embodiments, determining the available parameters for the knowledge graph lookup query based on the ontology corresponding to the knowledge graph can include performing graph introspection on the knowledge graph. Graph introspection includes, for example, a self-referential process by which a knowledge graph refers to its own ontology for determining the entities and properties within the knowledge graph. The parameters for the graph lookup query can be dynamic in that they can depend upon the knowledge graph ontology at the time of executing the graph lookup query. In at least one example generating a knowledge graph lookup query includes generating a structured data object, for example, a vector (or the like), that is structured according to the results of the graph introspection. According to various aspects of the present disclosure, the knowledge graph lookup query can be structured according to the knowledge graph architecture, and the knowledge graph ontology, at the time of generating the knowledge graph lookup query. In one or more examples, the system can use declarative graph query languages such as Cypher, or the like, for generating graph lookup queries.

At step 508, the system can receive one or more entities, or entity data corresponding to one or more entities, in response to the knowledge graph lookup query. As discussed above in connection with step 506, the entity data received in response to the knowledge graph lookup query can include, or correspond to, the entity identified in the new evidence, intentions identified in the new evidence, and/or the semantic meaning corresponding to the new evidence. In at least one example, if a knowledge graph lookup query is generally structured to retrieve data from the knowledge graph for determining "Where will the user be on Monday?", the result of the knowledge graph lookup query can include any entity that includes properties that relate to the user's locality (such as entities relating to travel, recent dining reservations, upcoming meetings, etc.).

At step 510, the system determines a contextual meaning corresponding to the new evidence based on the received entity data. In one example, a contextual meaning corresponding to the new evidence, based on received entities, relates to the system's understanding of the new evidence in the context of other entities stored in the knowledge graph. In various embodiments, while the semantic meaning corresponding to the new evidence (as determined at step 504) relates to a literal meaning corresponding to linguistic content or text data from the new evidence, a contextual meaning can be an inferred meaning supported by other related entities within the knowledge graph. In one example, determining a contextual meaning corresponding to the new evidence based on the received entities can provide the system with a more complete understanding of the new evidence such that the system can perform an action on behalf of the user. Determining a contextual meaning corresponding to the new evidence based on the received entities can include generating one or more inferences based on statistical relationships (weights, biases, etc.) between the received entities and the new evidence.

At step 512, the system determines if a predetermined threshold is met or satisfied. In one example, the predetermined threshold can be a comprehension threshold, where the comprehension threshold can be a confidence score (e.g., a percentage or numerical value) indicative of a reliable understanding of the intention corresponding to the new evidence. In certain examples, the intention comprehension threshold can be based on one or more predefined criteria or conditions corresponding to information typically extracted from a particular type of evidence or communication artifact. In at least one example, if the new evidence is determined to be a request for the system to make a reservation at a restaurant on behalf of the user, the predefined criteria or conditions can include aspects such as a time, a date, a particular restaurant, a reservation headcount, etc. In certain examples, the comprehension threshold can be determined to be met or satisfied when all criteria or conditions for the artifact and intention are satisfied. However, in other examples, the comprehension threshold can be determined to be met or satisfied when one or more criteria are satisfied such that a threshold of understanding is exceeded. In various examples, the threshold of understanding can depend upon the knowledge graph, as well as the weights and biases included within the knowledge graph. In one embodiment, the comprehension threshold, or confidence score threshold, can be about 0.8, 0.85, 0.9, 0.95, etc.

If, at step 512, the system determines that the comprehension threshold is not met, then the process 500 can proceed to step 514 where the system generates a request for additional context. For example, if one or more predefined criteria or conditions are unsatisfied, the system can generate a request for additional context from the user/requestor to receive the information for satisfying the criteria or conditions. Accordingly, the system can determine the context needed to proceed with completing a task on behalf of the user/requestor. In response to generating a request for additional context at step 514, the process 500 can return to step 512 for determining whether the comprehension threshold is satisfied (for example, based on any additional context received).

In one example, at step 516, the system can initiate an action corresponding to the new evidence. In various embodiments, step 516 can be an optional step. For example, the new evidence may not include an explicit request for an action to be taken, or the system may not determine that an action should be taken based on the system's processed understanding of the new evidence. In one example, an action can include generating one or more recommendations for the user. In another example, an action can include adjusting one or more weighted preferences in a user's local knowledge graph.

Figure 6:
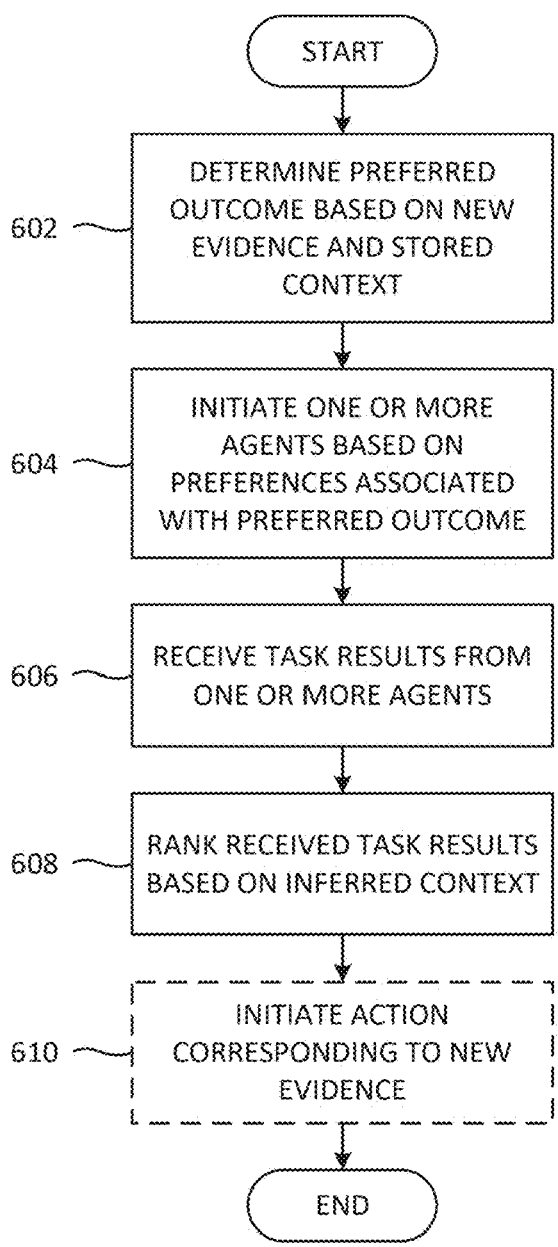
FIG. 6 shows a flowchart of an example recommendation generation and ranking process, according to one aspect of the present disclosure.

FIG. 6 is a flowchart of an example recommendation and ranking process 600. As discussed throughout the present disclosure, the system can be configured to delegate computing tasks (for example, recommending and/or booking travel arrangements, personalized scheduling, etc.) to AI agents. The process 600 can begin at step 602, where the system can determine a preferred outcome based on the new evidence (received at step 402 of the process 400) and stored context. In various embodiments, and when generating recommendations for a user or requester, the system can begin the recommendation generation process by first determining an understanding of the user's (or requester's) preferred outcome for the recommendation, independent of any available options for the recommendation (e.g., market options). In one example, consider a scenario in which a user is requesting that the system book a flight for the user. In this example, prior to determining any available flights for the user, the system can determine the user's preferences with respect to flights. In one or more examples, parameters corresponding to the user's preferred outcome can be aggregated and stored as an entity within the user's knowledge graph. In certain examples, the user's preferences can be stored as a cached layer within the knowledge graph. In one or more examples, the cached layer can be an entity stored within the knowledge graph, connected to the user's entity within the knowledge graph by an edge. The cached layer entity can store the output of an algorithm which has previously determined the user's preferences (for example, airline travel preferences). According to various aspects of the present disclosure, the system can generate a plurality of cached layers corresponding to entities and preferences.

At step 604, the system can initiate one or more agents (such as AI agents) based on the preferences associated with the preferred outcome. Referring again to the example of the system booking a flight for a user, at step 604, the system can scope (or filter) delegation of the one or more agents based on the user's determined flight preferences. In one example, and where the user is requesting that the system book a flight for the user from New York to San Francisco on a particular date, instead of the system initiating one more agents to determine the entirety of available flights on that date between those two locations, the system can instead scope the processing of the one or more agents to a particular set of constraints. Scoping the one or more agents not only results in more optimal and relevant results for the user, but also results in more efficient processing due to avoiding wasted computing resources on searching for irrelevant results outside of the user's scope of preference.

At step 606, the system receives the task results from the one or more agents. In one example, the task can correspond to the preferred outcome. In various embodiments, the system can receive and unsorted list of results, or a meta-list, from the one and more agents. In various embodiments, the received task results from the one or more agents correspond to the searched results that conform to particular scope (or one or more filters) for searching criteria as determined by the preferred outcome from step 602. In various embodiments, the received task results from the one or more agents can include a plurality of available flights that each conform to 1) a user's request for flight recommendations and 2) the user's flight preferences.

At step 608, the system can rank, or prioritize based on utility to the user, the received task results. In one example, the system can rank the task results based on context inferred from the user's knowledge graph. In various embodiments, the system can rank the task results based on the text data from the communication artifact (e.g., the context of a user request). For example, and referring again to the example of a user requesting that the system book flight for the user, the system can rank the meta-list as received at step 606 according to context from the user's knowledge graph, the system's understanding of perceived utility to the user, and other factors. For example, the system can determine, based on entities and related context from the knowledge graph, that the user is requesting a flight for business (rather than for personal reasons). Furthermore, the system can infer from the user's knowledge graph and the user's historical travel data (received from one or more applications connected to the system), that the user generally makes different purchasing decisions when travelling for business, as compared to when the user travels for personal reasons. In particular, the user may be more price-sensitive when traveling for business. Moreover, the system can infer that when travelling for business, price is the most important, or at least one of the most important, factors for the user when determining a purchasing decision. Accordingly, when determining between two suitable flight options for which the user can take to arrive to the user's destination on time, the system can apply a stronger weight or bias to the flight option of a lower monetary cost, even though the cheaper flight includes a layover and thus will result in a longer travel time. According to various aspects of the present disclosure, the system can infer user preferences based on historical user behavior, and the system can apply those inferred user preferences to decisions made on behalf of the user. In one example, by applying inferred user preferences to decisions made on behalf of the user, the system can maximize utility for the user.

In at least one example, the step 608 can further include executing a query expansion into a knowledge graph ontology and indexes to identify entity types, search predicates, etc., which may relate to the task results and user context. In various embodiments, the system can perform statistical aggregation on the results from the query expansion. In particular embodiments, the system can perform one or more resolvers on the results from the query expansion. In one or more examples, the system can generate utility calculations, based on user context from the knowledge graph, for each of the task results. In various embodiments, the system can create initial rankings based on the utility calculations. According to various aspects of the present disclosure, the system can perform lexical reranking processes on the task results. In various embodiments, performing lexical reranking processes can include leveraging one or more LLMs. For example, the system can provide the task results and a corresponding user request as inputs to an LLM for performing lexical reranking. In at least one embodiment, lexical reranking can include processing user patterns, data/knowledge explicitly (or implicitly) present in the task results, inferred knowledge not explicitly modeled in the user's knowledge graph, task results, request, etc.

At step 610 the system can initiate an action corresponding to the new evidence. In one example the step 610 can be an optional step. In one example, step 610 can include the system proceeding with booking a flight, a reservation, or another similar action, on behalf of the user. In various embodiments, the user can provide explicit instructions to the system for initiating an action. In one or more embodiments, the system can automatically initiate an action on behalf of the user.

Figure 7:
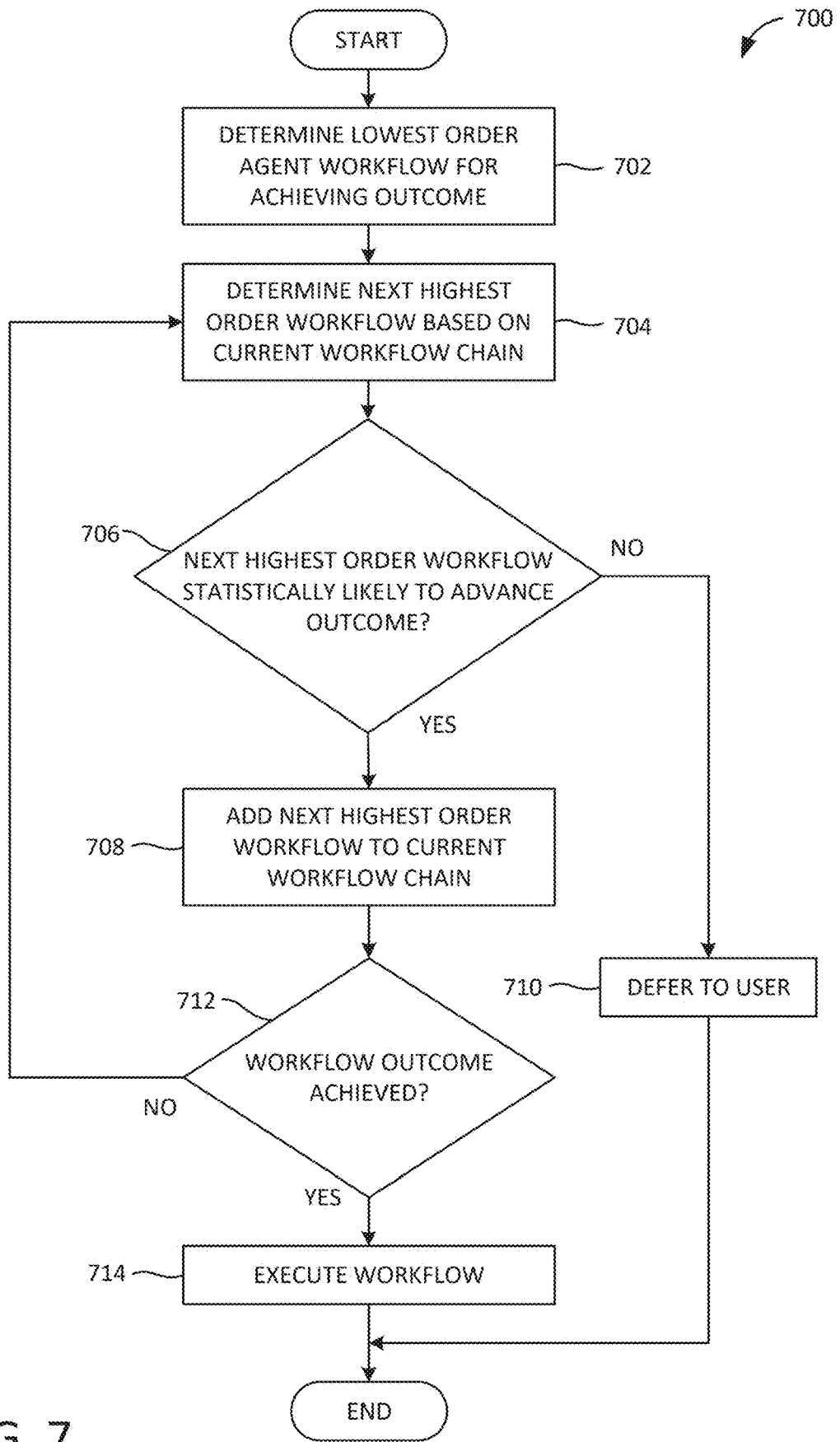
FIG. 7 shows a flowchart of an example agent workflow process, according to one aspect of the present disclosure.

Turning now to FIG. 7, a flowchart is shown corresponding to an agent workflow process 700. According to various aspects of the present disclosure, the system can be operatively configured to connect (or link together) a plurality of discrete agent workflows in order to achieve a particular outcome. For example, in response to determining, at step 416 of the process 400, that the system should indeed perform an action on behalf of the user, the system can determine the most effective way to accomplish the action given the user's preferences and other known/learned inferences and constraints. In various embodiments, the agent workflows can be discrete logic objects. In at least one embodiment, the agent workflows can be self-organizing, such that a particular combination of linked agents is determined at runtime according to statistical relationships between the agents. For example, the system can determine, based on a current chain of agent workflows, a next agent workflow that is most likely to complete the action or preferred outcome. The system can assemble a chain of discrete agents (or micro-services) to complete the action and/or outcome.

In one embodiment, the process 700 can begin at step 702, where the system determines the lowest order agent workflow for achieving an action or outcome. For example, an action or outcome can include booking a flight reservation, booking a restaurant reservation, etc. In various embodiments, the lowest order agent workflow for achieving the outcome can be determined by representing a vector populated with deconstructed entity and intention information in an embedding space, where nearby vectors in the embedding space can correspond to other workflows known to complete the outcome.

At step 704, in various embodiments, the system can then determine the next highest order workflow for achieving the outcome based on the current workflow chain. The processing for step 704 can resemble the processing for step 702.

In one example, at step 706, if the system determines that the next highest order workflow is statistically likely to advance the outcome, the process 700 can proceed to step 708 where the system adds the next highest order workflow to the current workflow chain. In at least one example, determining whether the next highest order workflow is statistically likely to advance the outcome can include reducing a statistical or latent representation of the agent workflow chain to an activation gating. However, at step 706, if the system determines that the next highest order workflow is not statistically likely to advance the outcome, the process 700 can proceed to step 710 where the system defers to the user for input regarding the current state of the agent workflow.

In response to adding the next highest order workflow to the workflow chain at step 708, the process 700 can proceed to step 712 where the system determines if the workflow outcome has been achieved. In a particular example, the system can determine that a workflow outcome has been achieved based on a predetermined end state or end node within the workflow. Accordingly, if the end node is reached such that no further workflows can be added to the chain, the system can determine that the workflow outcome has been achieved. In one embodiment, if the workflow outcome has not been achieved, the process 700 can return to step 704 where the system determines the next highest order workflow to add to the workflow chain based on the current workflow chain. In particular embodiments, if at step 712 the system determines that the workflow outcome is achieved, the system can proceed to step 714 where the system executed the workflow chain. In various embodiments, executing the workflow chain can include retrieving user credentials for accessing one or more third-party applications, such as calendar or email applications, credentials for a commercial airline user account, etc. Further, the system can compile the workflow, as well as all available activities and branches prior to runtime; however, the execution path is generally not determinable until runtime.

In particular embodiments, the logical construction of an agent workflow can include a logic flow, one or more activities, and a worker. In one embodiment, the logic flow can be a list of logical requirements to be satisfied before the workflow can be considered complete. In one example, the one or more activities can be tools/functions within the agent workflow (such as API integrations) that can be deployed to satisfy the requirements in the logic flow. In various embodiments, the worker can be a micro-services task manager. In one embodiment, while each sub-workflow in a workflow chain can include a worker, the complete workflow can also include a global worker that manages the processing of each sub-workflow. In various embodiments, the complete workflow can be managed within certain applications such as Temporal, or the like.

In one example, the system can integrate with third-party applications via one or more exposed software development kits (SDKs) or application programming interfaces (APIs). In one example, and for third-party applications or platforms offering developer toolkits (like Amadeus), the system can utilize official APIs to execute transactions directly through sanctioned channels.

In one example, the system can integrate with third-party applications via public interface automation. In various embodiments, where APIs aren't available, but public interfaces exist, the system can implement programmatic navigation solutions that interact with booking platforms' standard user interfaces while maintaining compliance with terms of service and automation on behalf of a user's request.

In one example, the system can integrate with delegated access frameworks. In various embodiments, and in scenarios generally requiring user credentials, and where users have connected or provided credentials to the system, the system can act on behalf of users to navigate various channels to complete bookings.

In one example, the system can integrate with autonomous agent connectors. In various embodiments, and for platforms with limited integration options, the system can deploy proprietary autonomous agents that navigate booking flows in a manner consistent with normal user interactions.

Figure 8A:
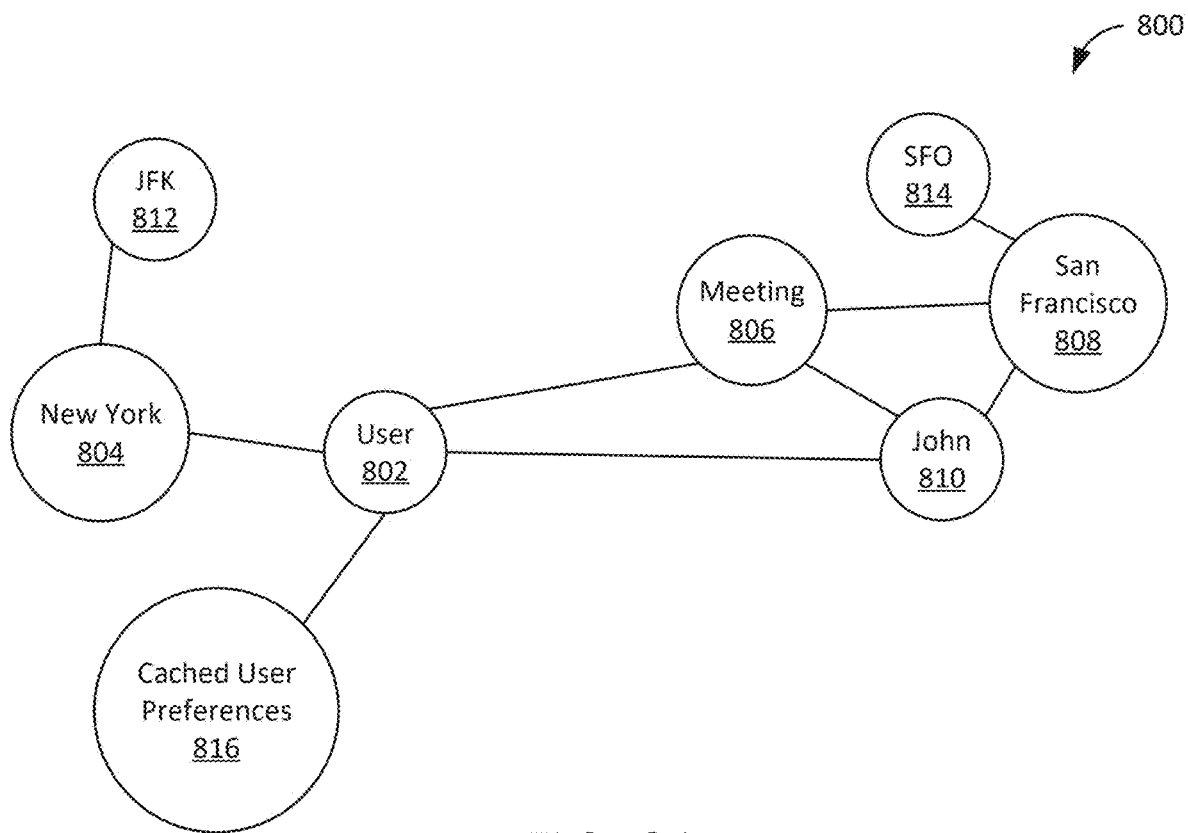
FIG. 8A shows a diagram of an example knowledge graph, according to one aspect of the present disclosure.
Figure 8B:
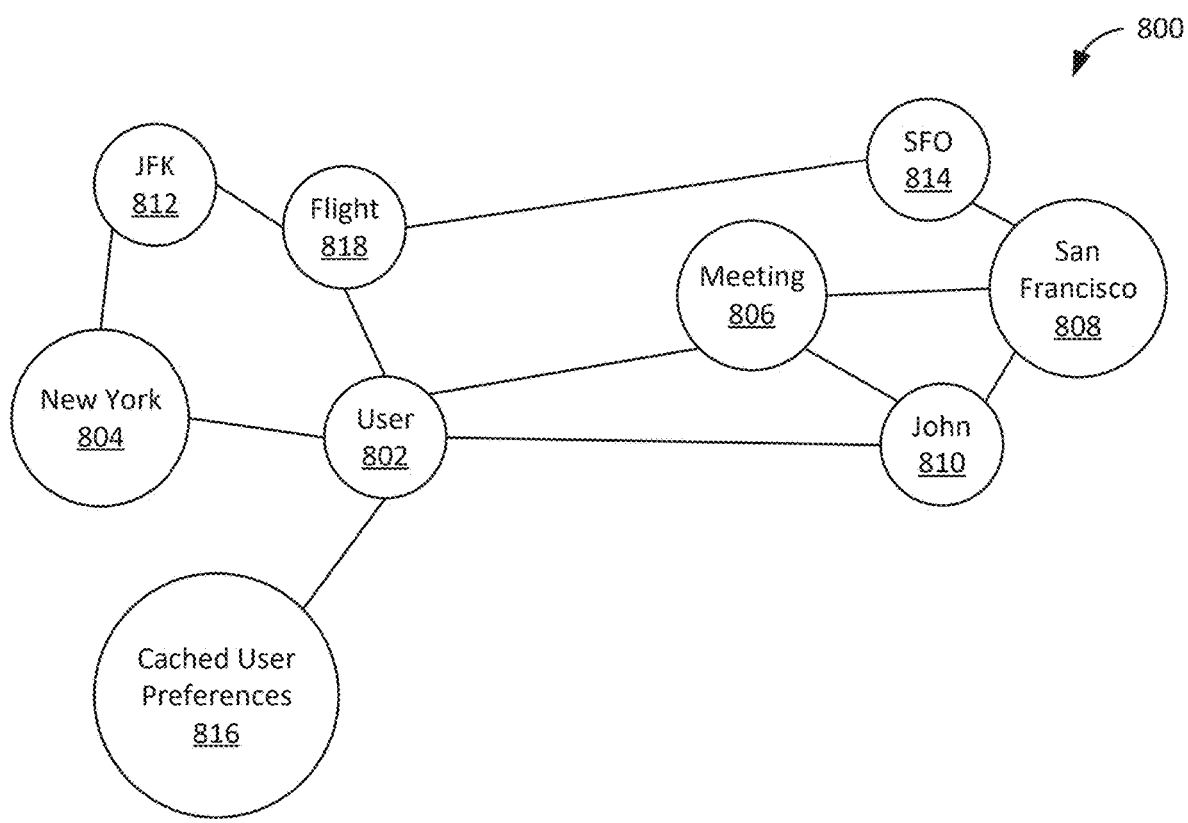
FIG. 8B shows a diagram of an example knowledge graph, according to one aspect of the present disclosure.

Turning now to FIGS. 8A and 8B, an example knowledge graph 800 is shown in various embodiments. Moreover, the example knowledge graph 800 includes a plurality of entities and edge connections between the entities. The entities shown in the knowledge graph 800 correspond to an example interaction between a user and the system (as illustrated and discussed below in connection with FIG. 9) in which the user requests for the system to book a flight on behalf of the user. More specifically, FIGS. 8A and 8B show knowledge graphs that illustrate a scenario in which two individuals (indicated by entities user 802 and John 810) are business partners and are scheduled to meet in San Francisco, CA. The user (corresponding to the user 810 entity) resides in New York, NY, and John (corresponding to the John 810 entity) resides in San Francisco. As will be discussed in greater detail below, the system can be configured to automatically modify a knowledge graph in response to receiving evidence or one or more communication artifact(s) indicative of a new entity. For example, FIGS. 8A and 8B illustrate how the system is configured to modify a knowledge graph to include a new entity corresponding to the user's flight from New York to San Francisco.

As will be understood by one of ordinary skill in the art, knowledge graphs are generally data structures that store and represent objects, such as entities, in a relational manner. For example, a knowledge graph can store a plurality of entities and their relationships to other entities. It should be understood from the discussion herein that the knowledge graphs 800 shown in FIGS. 8A and 8B, respectively, are for example purposes only, and knowledge graphs of much greater complexity are contemplated by the system as described herein.

Referring specifically to FIG. 8A, the knowledge graph 800 is shown in which a plurality of entities are connected by edges which represent relationships (and corresponding weights and/or biases) between the entities. In one example, the knowledge graph 800 includes an entity corresponding to a user 802. The user entity 802 includes various connections to other entities within the knowledge graph 800. In one example the user entity 802 as shown in FIG. 8A includes a connection, edge, or relationship, to a New York entity 804. For purposes of example, the user can reside in New York, and thus the relationship between the user entity 802 and the New York entity 804 can be a "lives in" relationship. According to various aspects of the present disclosure, the relationship between the user entity 802 and the New York entity 804 can also be a "works in" relationship, an "is currently located in" relationship, or generally any relationship based on the user's life context. In various embodiments, the relationship(s) between the user entity 802 and the New York entity 804 can be based on evidence artifacts received and processed by the system. In one or more examples, the edge shown connecting the user entity 802 and the New York entity 804 can represent a weighted relationship between the user entity 802 and the New York entity 804. For example, in response to processing a plurality of communications artifacts or evidence that includes information indicating that the user's home address is a New York address, the system can infer (based on a predetermined confidence score or threshold) that the user entity 802 has a "lives in" relationship with the New York entity 804. Moreover, in response to receiving an explicit instruction or expression from the user stating that the user lives in New York, the system can attribute a weight to the relationship between the user entity 802 and the New York entity 804 that represents a 100% confidence threshold.

Referring still to FIG. 8A, the user entity 802 includes an edge connection to an entity corresponding to a meeting 806. In one example, the system can be configured to populate the knowledge graph 800 to include the meeting entity 806 in response to receiving an evidence artifact, such as a calendar meeting invitation from a connected application (e.g., Outlook® or the like), which includes information regarding a scheduled meeting between the user entity 802 and one or more other individuals. In one example, the evidence artifact can include the meeting time, location, modality (teleconference, video conference, in-person, etc.), attendees, etc. The system can automatically modify the knowledge graph 800 to include a relationship between the meeting entity 806, the location at which the meeting will be held, and any other entities identified within the evidence artifact corresponding to the meeting entity 806. For example, the present embodiment illustrates the meeting entity 806 including an edge connection to a San Francisco entity 808. The system can be configured to automatically modify the knowledge graph to include an edge connection between the meeting entity 806 and the San Francisco entity 808 in response to identifying a San Francisco address as the indicated location for the meeting. In various embodiments, the system can be configured to infer, from other entities within the graph (such as communications between the user and an entity John 810), that the meeting will occur in San Francisco. The meeting entity 806 further includes an edge connection to the entity John 810. The John entity 810 and the user entity 802 can be connected by an edge based on, for example, both the user entity 802 and the John entity 810 being included as attendees in the calendar invite corresponding to the meeting entity 806. In one example, the edge connection, or relationship, between the user entity 802 and John 810 can be based on other processed data, such as emails on which on which both the user and John are listed. Accordingly, the meeting entity 806 can cause the system to automatically modify the knowledge graph to include a "has meeting with" relationship between the user entity 802 and the John entity 810, in addition to any preexisting relationships (such as a "business partners with" relationship).

As shown in the present embodiment, the New York entity 804 includes an edge connection to a JFK entity 812, and the San Francisco entity 808 includes an edge connection to a SFO entity 814, which are connected by an "airport in" relationship. As will be discussed below in connection with the description of FIG. 8B, the system can automatically modify the knowledge graph to include a new flight entity 818 and corresponding edge connections to the user entity 802, the JFK entity 812, and the SFO entity 814.

In one example, the system can be configured to store outputs from one or more algorithms as entities within knowledge graphs. For example, the system can be configured to process historical evidence corresponding to a user's travel history to determine and/or infer the user's travel preferences, and the system can store the user's determined travel preferences as an entity in the knowledge graph. In one embodiment, outputs from one or more algorithms, stored as entities, can be cached layers within the knowledge graph. Storing preprocessed data as a cached layer within the knowledge graph improves system performance (for example, by reducing latency) given the system need not reprocess information for which a cached layer is already stored (the system can reference a prior algorithm output stored in the cached layer).

Referring now to FIG. 8B, the example knowledge graph 800 is shown including a flight entity 818. In one example, the flight 818 entity represents the system's understanding of one or more received evidence artifacts corresponding to a particular flight. In one example, in response to receiving and processing an evidence artifact indicative of a flight from JFK to SFO on which the user will be a passenger, the system can automatically modify the knowledge graph to include the flight entity 818 and corresponding edge connections to the user entity 802, the JFK entity 812, and the SFO entity 814. According to various aspects of the present disclosure, the system is configured to modify the knowledge graph such that the knowledge graph is "self-curating." For example, in response to receiving and processing an evidence artifact corresponding to a flight, the system can use existing context within the knowledge graph for determining how to modify the knowledge graph for including the flight as its own entity (the flight entity 818). In various embodiments, the system can compare a vector embedding of the evidence artifact corresponding to the flight to other knowledge graph entities in an embedding domain for determining statistical relationships between the flight entity 818 and other entities stored within the knowledge graph. In certain embodiments, the system can determine that two entity vector embeddings with a cosine similarity of greater than about 0.8 represent the same entity. In various embodiments, the system can generate a new entity within the knowledge graph if a vector embedding corresponding to linguistic content from a newly received communication artifact or evidence does not have a cosine similarity of greater than 0.8 with another vector embedding from the knowledge graph.

Figure 9:
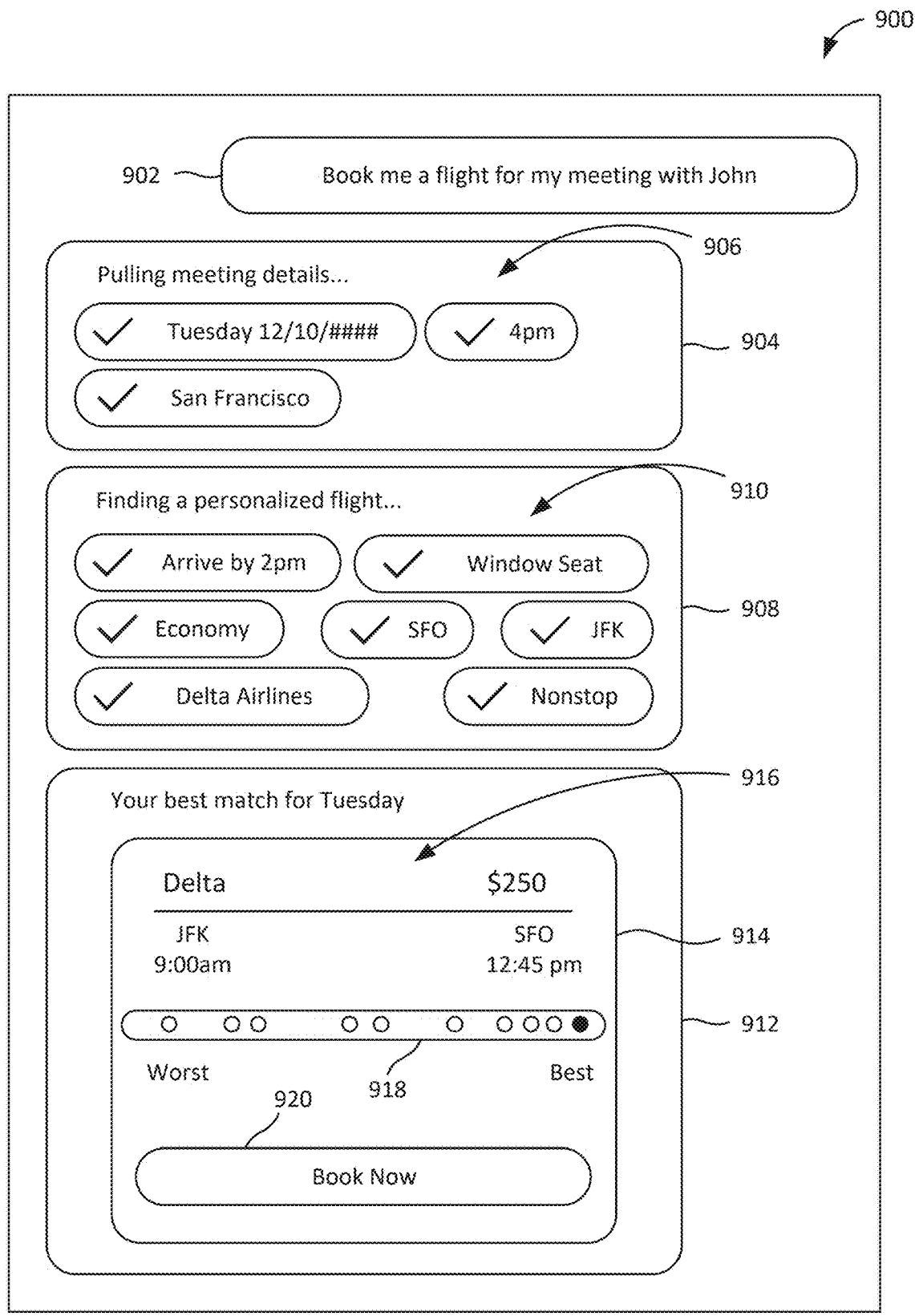
FIG. 9 shows a screenshot of an example user and system interaction, according to one aspect of the present disclosure.

Turning now to FIG. 9, a screenshot 900 is shown illustrating an example user and system interaction. It should be understood from the discussion herein that a user can interact with the system in a variety of ways. For example, a user can interact with the system via a graphical user interface (GUI) on his/her mobile device. In another example, a user can interact with the system via sending an email to the system (via a designated system email address) with prompts, requests, tasks, reminders, or generally any content (text, audio, images, etc.). In one or more examples, the system can also process user data received from one or more connected applications. As shown in the present embodiment, the screenshot 900 shows a user interacting with the system within a messaging platform or GUI interface. According to various aspects of the present disclosure, the screenshot 900 can be a screenshot of a messaging platform such as iMessage® (or the like), the screenshot 900 can be a screenshot from a messaging feature within a social media application such as Instagram® (or the like), the screenshot 900 can be a screenshot from a proprietary application within the system's platform ecosystem, etc. In various embodiments, the system can be configured to continuously monitor for communication artifacts received via the one or more connected applications or data sources.

In one example, the screenshot 900 includes a user prompt 902 in which the user requests "Book me a flight for my meeting with John." According to various aspects of the present disclosure, in response to the system receiving the user prompt 902, the system can process the user prompt for determining one or more entities within the user prompt. Moreover, the system can process the user prompt 902 to identify one or more intentions corresponding to the user prompt 902. For example, the system can identify "John" as an entity within the user prompt 902. The system can identify "my meeting" as an entity within the user prompt 902. The system can identify "book me a flight" as an intention of the user prompt 902. In response to determining one or more entities within the user prompt 902, the system can generate a graph lookup query including information from the user request 902 such as the entities "John" and "my meeting." The system can be configured to extract entities and intentions from unstructured linguistic content, such as the user prompt 902, and generate a structured data object from the extracted entities and intentions. In various embodiments, the structured data object can be a knowledge graph lookup query. The structure of the knowledge graph lookup query can be based on a knowledge graph ontology at the time when the user prompt 902 is received.

The screenshot 900 includes a system reply 904. In one example, the system reply 904 includes the text "Pulling meeting details . . . ". According to various aspects of the present disclosure, the step 904 illustrates that, in response to receiving and processing the user prompt 902, the system can determine that, prior to executing the task of "Book me a flight for my meeting with John," the system can first determine information about the "meeting with John." The system can determine that receiving information about the "meeting with John" is an initial (or lowest level) action or step to be executed in the processing workflow/pipeline for booking the flight.

The system can be configured to retrieve details corresponding to the "meeting with John" from the knowledge graph. Referring back to FIG. 8A, and for purposes of example, the system can identify the meeting entity 806 as being the "meeting with John" referenced in the user prompt 902. The system can identify the meeting entity 806 as being the "meeting with John" referenced in the user prompt 902 based on the contextual relationship between the user entity 802, the meeting entity 806, and the John entity 810 stored within the knowledge graph 800. In one example, the system can implement one or more natural language processing algorithms to determine a semantic meaning of the user prompt 902. In response to determining the semantic meaning of the user prompt 902, the system can generate a graph lookup query for querying the knowledge graph to receive (or retrieve) data corresponding to one or more entities which may include context regarding the "meeting with John." In one example, prior to generating a graph lookup query, the system can determine available parameters for the graph lookup query. Determining parameters for the graph lookup query can include performing a graph introspection process. Performing a graph introspection process on the knowledge graph can expose the entities/nodes, edges/relationships, properties, weights, biases, and connections between the entities in the knowledge graph. The graph introspection process can include processing an ontology corresponding to the knowledge graph. In response to performing a graph introspection process, the system can determine the entities and other parameters (based on the ontology) that can be searched or accessed within the knowledge graph.

As shown in the reply 904, the system can retrieve meeting details 906 based on stored context within the knowledge graph. For example, the system can determine that the meeting details 906 include that the meeting will take place on Tuesday, December 10$^{th}$, at 4:00 PM in San Francisco. In various embodiments, despite specific information or details regarding the "meeting with John" being absent from the user prompt 902, the system can be configured to resolve ambiguities in the user prompt 902. The system can be configured to resolve ambiguities in the user prompt 902 via one or more LLMs. The system can be configured to comprehend (via statistical determinations) a contextual meaning of the user prompt 902 based on context corresponding to the user, as stored within the knowledge graph. For example, the meeting entity 806 in the knowledge graph 800 can include a "time" property with a value "4 pm." In various embodiments, the meeting entity 806 can also include a "location" property, although consider a scenario in which the "location" property is empty, or "null," given a specific location was not defined in the communication artifact from which the meeting entity 806 was generated. The system can infer, based on one or more weighted relationships between the meeting entity 806, the John entity 810, and the San Francisco entity 808 (where John is located), and furthermore based on the user's request for a flight to be booked for the meeting, that the meeting location is San Francisco.

The system can continue to act on behalf of the user for furthering execution of the user prompt 902. For example, the screenshot 900 shows a reply step 908 including the text "Finding a personalized flight . . . ". In one example, the reply step 908 shows a plurality of travel preferences 910. The plurality of travel preferences 910 illustrated in the reply step 908 correspond not only to preferences that the user has explicitly provided to the system (for example, during data ingestion or via using the system), but also to inferred preferences. The travel preferences 910 can include general requirements for the to-be-booked flight, such as departure airport (JFK), arrival airport (SFO), latest time of arrival. In one example, the system can infer, from data within the user's knowledge graph, that the "meeting with John" corresponds to business (based on an inferred business relationship between the user and John). Accordingly, the system can generate flight preferences that correspond to the user's historical behavior when flying for business reasons. Based on the user's historical travel patterns and behaviors, the system can generate inferences which indicate that the user's behavior when travelling for business is different from when the user travels for non-business reasons. For example, based on historical travel behavior, the system can infer that when traveling for business, the user generally purchases seats in economy class, and the user is generally more price-sensitive when flying for business. In various embodiments each of the travel preferences 910 of the user's personalized flight are determined based on the system's explicit and inferred understanding of the user's knowledge graph. In certain embodiments, the travel preferences 910 (or at least a subset of the travel preferences) can be stored as a separate entity within a knowledge graph. For example, and referring back to the knowledge graphs 800 from FIGS. 8A and 8B, the travel preferences 910 can be stored within the cached user preferences entity 816. In various embodiments, storing the travel preferences 910 as a cached layer within the knowledge graph allows for the system to more quickly determine and retrieve the user's travel preferences by referencing the cached layer (rather than performing a more computationally cumbersome graph walking process).

In response to determining the user's travel preferences 910, the system, as shown at the recommendation reply step 912, can be configured to initiate one or more delegate agents (such as AI/LLM agents) for searching for one or more flights that match the personalized flight parameters from the reply step 908. In one example, the system can scope the delegated agents based on the determined user travel preferences 910. Using the determined user travel preferences 910 for scoping (or tailoring) the searching instructions for the delegated agents can result in improved and more accurate recommendation generations. In one example, scoping the delegated agents based on the user travel preferences 910 can result in a technical improvement, as compared to other systems, because the system requires a lesser amount of computing resources given the system is provided with a more specific computing task. In one embodiment, an LLM can generate one or more prompts, based on the travel preferences 910, for initiating the one or more delegate agents to search for available flights.

As shown at the recommendation reply step 912, and in response to receiving results (one or more potential flight options) from the delegated agents, the system can present the user with a recommended flight option 914. In one example, the system can rank the potential flight options according to the system's understanding of the user's travel preferences and overall utility to the user. For example, when determining which flight of the plurality of flights to present to the user as a most relevant flight, the system can first present the fight with the cheapest monetary price because the system may include an inferred understanding that, when traveling for business, the user generally prioritizes price over other factors (such as time of arrival, airline, etc.). In various embodiments, the recommended flight option 914 can include flight details 916 that conform to each of the travel preferences 910. According to various aspects of the present disclosure, the system can present to the user a ranked list 918. The ranked list 918 can represent each of the potential flight options, ranked from "best" to "worst" based on a measure of best fit with respect to the user's travel preferences 910 and overall utility to the user. A user can scroll, slide, click, etc., through the ranked list 918 for reviewing and considering each of the potential options in the ranked list 918.

In one example, a "Book Now" button/selection 920 can initiate an automated booking process by which the system delegates one or more AI/ML agents to proceed with booking the recommended flight (or a different selected flight) for the user. In one example, in response to the user selecting the "Book Now" button 920, the system can interface with a third-party API corresponding to the organization with which the recommend a flight is associated. For example, in response to the user clicking the "Book Now" button 920, the system can query the third-party API for determining the parameters to include in an API call for booking a flight on behalf of a user. In various embodiments, the API call parameters can include the user's name, birthday, address, payment information, flight numbers, itinerary details, etc. In response to selecting the "Book Now" button 920, the system can be configured to automatically book the flight on behalf of the user. In another example, the system can present the user with a GUI in which the user can book the flight for himself/herself. In various embodiments, the user can establish preferences for agentic behavior performed by the system on behalf of the user (for example, if the user prefers to have flights booked automatically, if the user prefers to personally book flights after considering recommendations, etc.).

Figure 10:
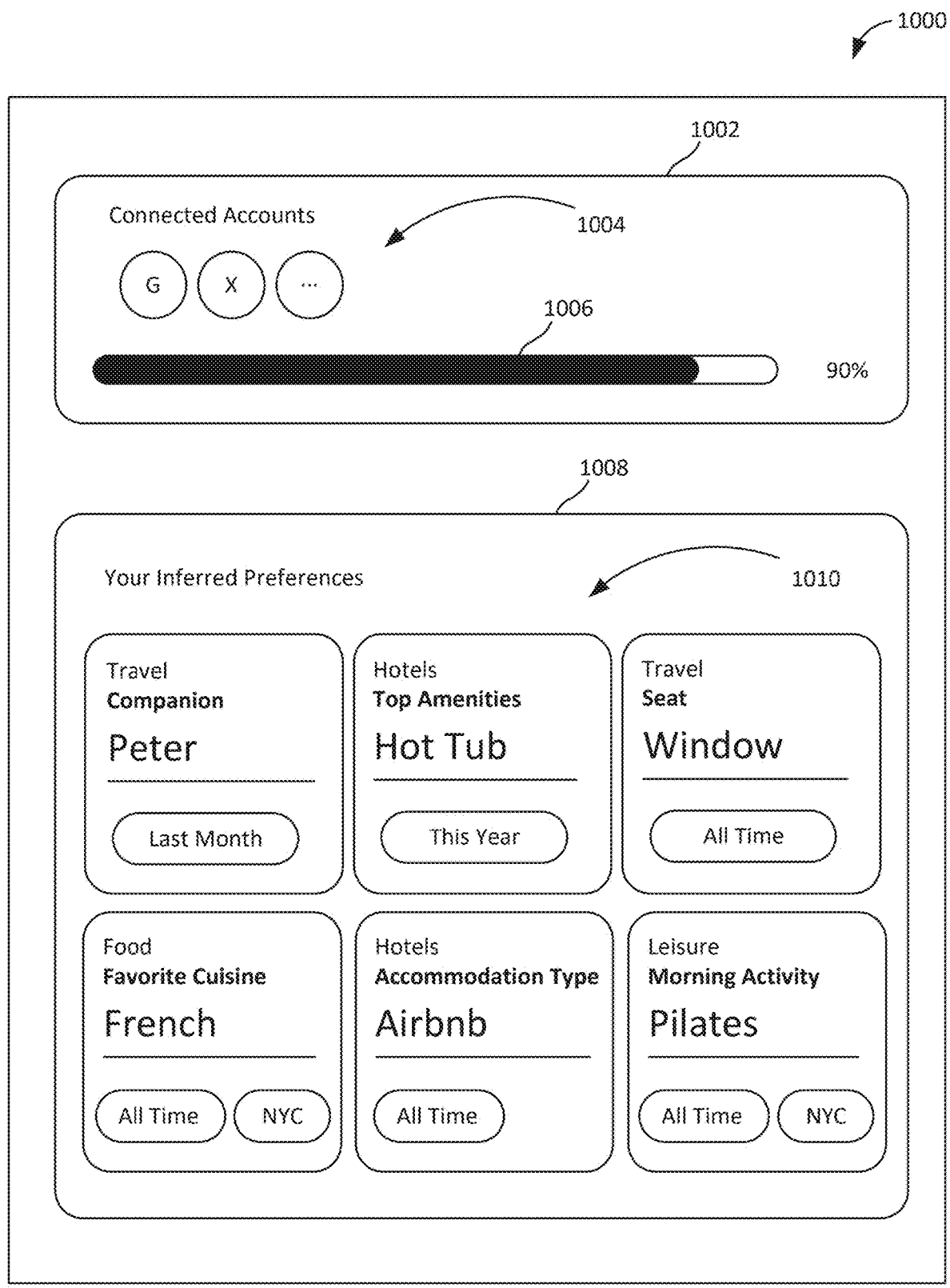
FIG. 10 shows a screenshot of an example system dashboard, according to one aspect of the present disclosure.

Turning to FIG. 10, a screenshot 1000 of an example system dashboard is shown. In various embodiments, the system dashboard can include a connected accounts pane 1002. The connected accounts pane 1002 can display icons or thumbnails corresponding to one or more connected accounts 1004. The one or more connected accounts 1004 can correspond to third-party connected software applications or platforms. For example, the connected accounts 1004 can include accounts from the Google® suite, X (formerly Twitter®) accounts, Microsoft® suite accounts (for example, Outlook®, Word®, OneNote®, etc.), Slack®, Pinterest®, and generally any application or platform on which a user can have an account and personalized data. The connected accounts pane 1002 can also include an account connection status bar 1006. The account connection status bar 1006 can represent an account connection progress. For example, the account connection status bar 1006 includes an indication that an account connection status is 90%. The account connection status bar 1006 progress can represent the system's progress when ingesting data from one or more connected accounts. The account connection status bar 1006 progress can indicate whether one or more accounts (or account features) are unconnected (for example, if the progress is below 100%).

The screenshot 1000 of the system dashboard further illustrates an inferred preferences pane 1008. The inferred preferences pane 1008 can include a plurality of user preferences 1010 corresponding to inferences and other statistical calculations, as determined by the system, based on the user's behavior and activity as represented by entities within the knowledge graph. For example, each of the inferred preferences in the inferred preferences pane 1008 can relate to one or more specific instances of user behavior as represented within the knowledge graph. Each pane, or each inferred preference, within the inferred preferences pane 1008 can correspond to a time and/or location over which the preference was inferred. The system can be configured to automatically modify and/or reweight the inferred preferences in response to receiving new evidence and communication artifacts.

Figure 11:
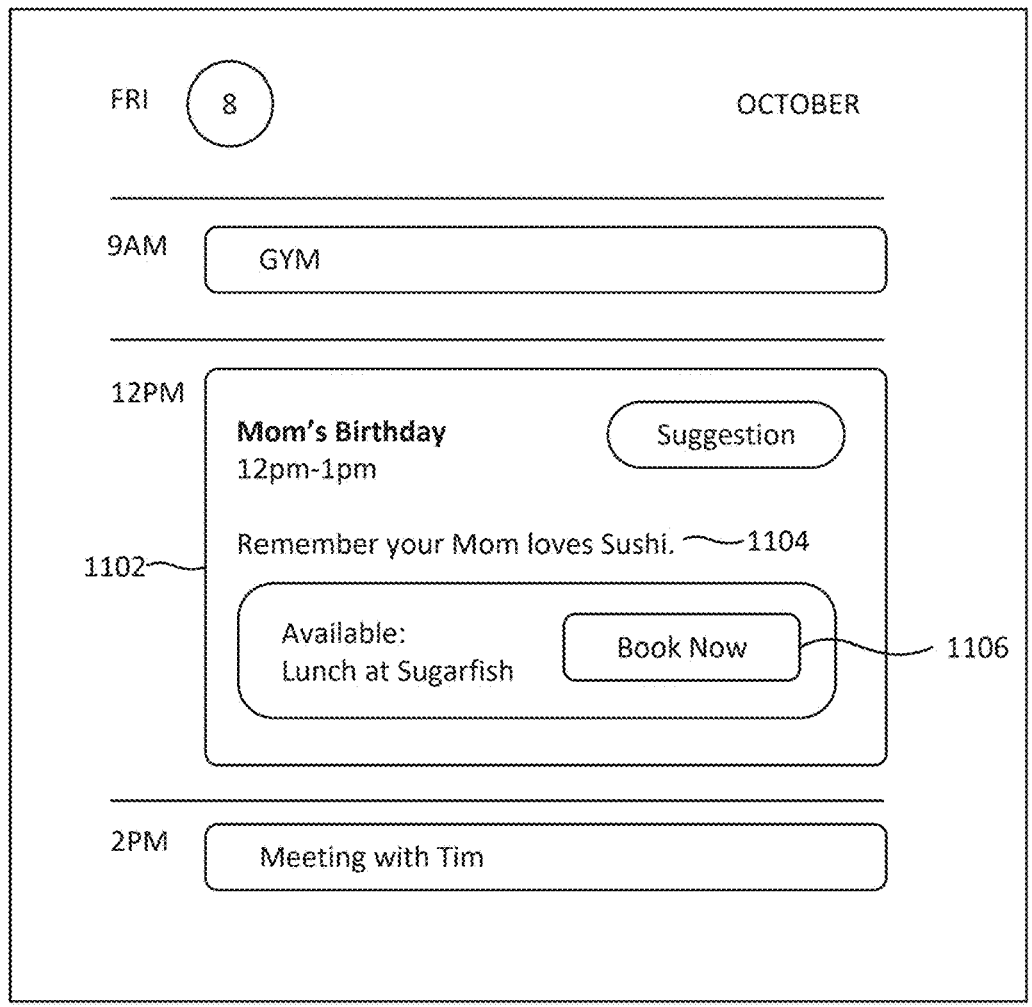
FIG. 11 shows a screenshot of an example autonomous recommendation, according to one aspect of the present disclosure.

FIG. 11 is a screenshot 1100 of an example autonomous suggestion. In one embodiment, the screenshot 1100 illustrates an example scheduling suggestion 1102 presented within a user's digital calendar. The example scheduling suggestion 1102 includes a suggestion for booking lunch at a particular restaurant for the user's mother's birthday. According to various aspects of the present disclosure, the example scheduling suggestion 1102 can be generated and displayed within the user's digital calendar based on information inferred from the user's knowledge graph. In another embodiment, the example scheduling suggestion 1102 can be generated based on information explicitly provided by the user to the system. For example, the user can explicitly provide the system with the user's mother's birthday during data ingestion, during regular system use, etc. However, the system can infer, based on information stored in the user's knowledge graph corresponding to sushi restaurants at which the user and his/her mother have dined, that the user's mother has an affinity for sushi. Accordingly, the system can generate and display the inference, "Remember your Mom loves Sushi" 1104, as supporting reasoning for the particular restaurant within the scheduling suggestion 1102. In one example, and prior to displaying the scheduling suggestion 1102, the system can automatically determine, without human interaction or instruction, that the particular restaurant has availability to accommodate the scheduling suggestion. In response to selecting the "Book Now" button 1106, the system can generate an API call to interface with the restaurant's scheduling application to confirm the reservation.

Figure 12:
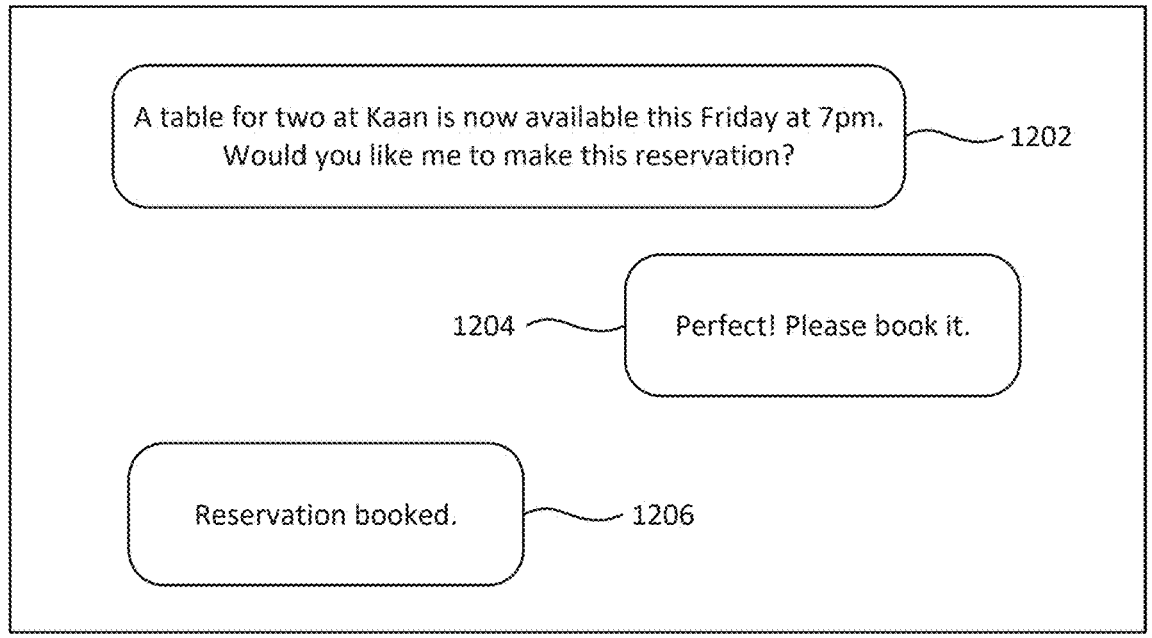
FIG. 12 shows a screenshot of an example user and system interaction, according to one aspect of the present disclosure.

FIG. 12 is a screenshot 1200 of an example user and system interaction. In one example the screenshot 1200 illustrates the system proactively presenting a user with a suggestion 1202 for a potential dinner reservation. In various embodiments, the system can generate and display the potential dinner reservation automatically and without first receiving a user prompt. The system can determine, based on known patterns corresponding to historical user behavior, that the user typically dines out on Friday evenings with one other person. The system can integrate with third-party APIs such as Resy®, OpenTable®, etc. The system can integrate and communicate with third-party APIs by querying the third-party APIs to determine required API call parameters for booking reservations. At step 1204, the user responds to the system suggestion 1202 by replying "Perfect! Please book it.", which the system determines as being the user's approval and confirmation to proceed with making the reservation as suggested. At step 1206 the system can confirm that the reservation has been booked.

CONCLUSION

The disclosure herein can be carried out wholly or in part by a computing environment, which can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

Various applications and/or other functionality may be executed in the computing environment according to various embodiments. Also, various data is stored in a database that is accessible to the computing environment. The database can be representative of a plurality of databases as can be appreciated. The data stored in the database, for example, may be associated with the operation of the various applications and/or functional entities described herein.

The computing environment can communicate with a plurality of computing devices and querying devices (which may include computing devices) via a network. The network includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

Aspects, features, and benefits of the systems, methods, processes, formulations, apparatuses, and products discussed herein will become apparent from the information disclosed in the figures and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the figures or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and processes to the precise forms disclosed. Many modifications and variations are possible in light of the above teaching.

The embodiments were chosen and described in order to explain the principles of the systems and processes and their practical application so as to enable others skilled in the art to utilize the systems and processes and various embodiments and with various modifications as are suited to the particular use contemplated. Alternative embodiments will become apparent to those skilled in the art to which the present systems and processes pertain without departing from their spirit and scope. Accordingly, the scope of the present systems and processes is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied.

The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

Clause 1. A method including: receiving, at a processor, a communication artifact from a data source operatively connected to the processor, wherein the communication artifact includes text data directed towards a user; extracting the text data from the communication artifact; processing the text data to determine a semantic meaning of the text data, the semantic meaning including an intention of the text data; generating a knowledge graph lookup query including a request for entity data from a plurality of entities stored in a knowledge graph corresponding to the user, wherein the knowledge graph lookup query includes one or more parameters based on the intention of the text data; receiving the entity data from the knowledge graph; processing the entity data to determine a contextual meaning of the text data, wherein processing the entity data includes determining one or more statistical relationships between the text data and the entity data; and initiating an action on behalf of the user based on the contextual meaning of the text data.

Clause 2. The method of clause 1 or any other clause herein, wherein processing the text data to determine the intention and the semantic meaning of the text data includes processing the text data via one or more large language models operatively configured to perform natural language processing.

Clause 3. The method of clause 1 or any other clause herein, wherein prior to generating the knowledge graph lookup query, querying the knowledge graph for an ontology including representations of the plurality of entities and a plurality of properties corresponding to each of the plurality of entities.

Clause 4. The method of clause 3 or any other clause herein, wherein processing the ontology to determine one or more properties of one or more entities from the plurality of properties corresponding to the plurality of entities associated with the intention of the text data.

Clause 5. The method of clause 4 or any other clause herein, wherein the one or more parameters of the knowledge graph lookup query includes the one or more entities including the one or more properties associated with the intention of the text data.

Clause 6. The method of clause 4 or any other clause herein, wherein determining that the one or more properties of one or more entities are associated with the intention of the text data includes determining a statistical relationship between the one or more properties of one or more entities and the intention of the text data.

Clause 7. The method of clause 6 or any other clause herein, wherein determining the statistical relationship includes further determining that one or more statistical weights and/or biases corresponding to the entity data within the knowledge graph exceed a predetermined threshold.

Clause 8. A system including: a processor; and a memory on which are stored machine-readable instructions that when executed by the processor, cause the processor to: receive, at a processor, a communication artifact from a data source operatively connected to the processor, wherein the communication artifact includes text data directed towards a user; extract the text data from the communication artifact; process the text data to determine a semantic meaning of the text data, the semantic meaning including an intention of the text data; generate a knowledge graph lookup query including a request for entity data from a plurality of entities stored in a knowledge graph corresponding to the user, wherein the knowledge graph lookup query includes one or more parameters based on the intention of the text data; receive the entity data from the knowledge graph; process the entity data to determine a contextual meaning of the text data, wherein processing the entity data includes determining one or more statistical relationships between the text data and the entity data; and initiate an action on behalf of the user based on the contextual meaning of the text data.

Clause 9. The system of clause 8 or any other clause herein, wherein processing the text data to determine the intention and the semantic meaning of the text data includes processing the text data via one or more large language models operatively configured to perform natural language processing.

Clause 10. The system of clause 8 or any other clause herein, wherein the processor is further caused to, prior to generating the knowledge graph lookup query, query the knowledge graph for an ontology including representations of the plurality of entities and a plurality of properties corresponding to each of the plurality of entities.

Clause 11. The system of clause 10 or any other clause herein, wherein the processor is further caused to process the ontology to determine one or more properties of one or more entities, from the plurality of properties corresponding to the plurality of entities, associated with the intention of the text data.

Clause 12. The system of clause 11 or any other clause herein, wherein the one or more parameters of the knowledge graph lookup query includes the one or more entities including the one or more properties associated with the intention of the text data.

Clause 13. The system of clause 11 or any other clause herein, wherein determining that the one or more properties of one or more entities are associated with the intention of the text data includes determining a statistical relationship between the one or more properties of one or more entities and the intention of the text data.

Clause 14. The system of clause 13 or any other clause herein, wherein determining the statistical relationship includes further determining that one or more statistical weights and/or biases corresponding to the entity data within the knowledge graph exceed a predetermined threshold.

Clause 15. A non-transitory computer readable medium including instructions, that when read by a processor, cause the processor to perform: receiving, at the processor, a communication artifact from a data source operatively connected to the processor, wherein the communication artifact includes text data directed towards a user; extracting the text data from the communication artifact; processing the text data to determine a semantic meaning of the text data, the semantic meaning including an intention of the text data; generating a knowledge graph lookup query including a request for entity data from a plurality of entities stored in a knowledge graph corresponding to the user, wherein the knowledge graph lookup query includes one or more parameters based on the intention of the text data; receiving the entity data from the knowledge graph; processing the entity data to determine a contextual meaning of the text data, wherein processing the entity data includes determining one or more statistical relationships between the text data and the entity data; and initiating an action on behalf of the user based on the contextual meaning of the text data.

Clause 16. The non-transitory computer readable medium of clause 15 or any other clause herein, wherein processing the text data to determine the intention and the semantic meaning of the text data includes processing the text data via one or more large language models operatively configured to perform natural language processing.

Clause 17. The non-transitory computer readable medium of clause 15 or any other clause herein, further including instructions that when read by the processor, cause the processor to perform prior to generating the knowledge graph lookup query, querying the knowledge graph for an ontology including representations of the plurality of entities and a plurality of properties corresponding to each of the plurality of entities.

Clause 18. The non-transitory computer readable medium of clause 17 or any other clause herein, further including instructions that when read by the processor, cause the processor to perform processing the ontology to determine one or more properties of one or more entities, from the plurality of properties corresponding to the plurality of entities, associated with the intention of the text data.

Clause 19. The non-transitory computer readable medium of clause 18 or any other clause herein, wherein the one or more parameters of the knowledge graph lookup query includes the one or more entities including the one or more properties associated with the intention of the text data.

Clause 20. The non-transitory computer readable medium of clause 18 or any other clause herein, wherein determining that the one or more properties of one or more entities are associated with the intention of the text data includes determining a statistical relationship between the one or more properties of one or more entities and the intention of the text data, and wherein determining the statistical relationship includes further determining that one or more statistical weights and/or biases corresponding to the entity data within the knowledge graph exceed a predetermined threshold.

Clause 21. A method including receiving, at a processor, a communication artifact from a data source operatively connected to the processor, wherein the communication artifact includes text data directed towards a user; extracting the text data from the communication artifact; processing the text data to identify an entity and one or more entity properties associated with the communication artifact; generating an entity vector embedding including data corresponding to the entity and the one or more entity properties; comparing the entity vector embedding to a known entity vector embedding, wherein the known entity vector embedding includes data corresponding to a known entity, and wherein the known entity is stored in a knowledge graph corresponding to the user; and modifying the knowledge graph based on a similarity metric between the entity vector embedding and the known entity vector embedding.

Clause 22. The method of clause 21 or any other clause herein, including prior to extracting the text data from the communication artifact, extracting metadata from the communication artifact; and processing the metadata to identify one or more indications that the text data includes permissible text data.

Clause 23. The method of clause 21 or any other clause herein, wherein the data source is an electronic mail ("email") system, and wherein the communication artifact is an email message.

Clause 24. The method of clause 21 or any other clause herein, wherein modifying the knowledge graph includes, in response to determining a similarity metric below a predetermined threshold, adding the entity to the knowledge graph.

Clause 25. The method of clause 21 or any other clause herein, wherein modifying the knowledge graph includes: in response to determining a similarity score above a predetermined threshold, determining that the known entity within the knowledge graph corresponds to the entity associated with the communication artifact; and adjusting one or more statistical weights and/or biases corresponding to the known entity based on the entity and the one or more entity properties associated with the communication artifact.

Clause 26. The method of clause 25 or any other clause herein, further including modifying a representation of the known entity within an ontology corresponding to the knowledge graph to include the one or more entity properties.

Clause 27. The method of clause 20 or any other clause herein, wherein processing the text data to identify the entity and the one or more entity properties associated with the communication artifact includes processing the text data via one or more large language models operatively configured to perform natural language processing.

Clause 28. A system including: a processor; and a memory on which are stored machine-readable instructions that when executed by the processor, cause the processor to: receive, at a processor, a communication artifact from a data source operatively connected to the processor, wherein the communication artifact includes text data directed towards a user; extract the text data from the communication artifact; process the text data to identify an entity and one or more entity properties associated with the communication artifact; generate an entity vector embedding including data corresponding to the entity and the one or more entity properties; compare the entity vector embedding to a known entity vector embedding, wherein the known entity vector embedding includes data corresponding to a known entity, and wherein the known entity is stored in a knowledge graph corresponding to the user; and modify the knowledge graph based on a similarity metric between the entity vector embedding and the known entity vector embedding.

Clause 29. The system of clause 28 or any other clause herein, wherein the processor is further caused to: prior to extracting the text data from the communication artifact, extract metadata from the communication artifact; and process the metadata to identify one or more indications that the text data includes permissible text data.

Clause 30. The system of clause 28 or any other clause herein, wherein the data source is an electronic mail ("email") system, and wherein the communication artifact is an email message.

Clause 31. The system of clause 28 or any other clause herein, wherein modifying the knowledge graph includes, in response to determining a similarity metric below a predetermined threshold, adding the entity to the knowledge graph.

Clause 32. The system of clause 28 or any other clause herein, wherein modifying the knowledge graph includes the processor being further caused to: in response to determining a similarity score above a predetermined threshold, determine that the known entity within the knowledge graph corresponds to the entity associated with the communication artifact; and adjust one or more statistical weights and/or biases corresponding to the known entity based on the entity and the one or more entity properties associated with the communication artifact.

Clause 33. The system of clause 32 or any other clause herein, wherein the processor is further caused to modify a representation of the known entity within an ontology corresponding to the knowledge graph to include the one or more entity properties.

Clause 34. The system of clause 28 or any other clause herein, wherein the processor being caused to process the text data to identify the entity and the one or more entity properties associated with the communication artifact includes processing the text data via one or more large language models operatively configured to perform natural language processing.

Clause 35. A non-transitory computer readable medium including instructions that, when read by a processor, cause the processor to perform: receiving, at a processor, a communication artifact from a data source operatively connected to the processor, wherein the communication artifact includes text data directed towards a user; extracting the text data from the communication artifact; processing the text data to identify an entity and one or more entity properties associated with the communication artifact; generating an entity vector embedding including data corresponding to the entity and the one or more entity properties; comparing the entity vector embedding to a known entity vector embedding, wherein the known entity vector embedding includes data corresponding to a known entity, and wherein the known entity is stored in a knowledge graph corresponding to the user; and modifying the knowledge graph based on a similarity metric between the entity vector embedding and the known entity vector embedding.

Clause 36. The non-transitory computer readable medium of clause 35 or any other clause herein, further including instructions that, when read by the processor, cause the processor to perform: prior to extracting the text data from the communication artifact, extracting metadata from the communication artifact; and processing the metadata to identify one or more indications that the text data includes permissible text data.

Clause 37. The non-transitory computer readable medium of clause 35 or any other clause herein, wherein the data source is an electronic mail ("email") system, and wherein the communication artifact is an email message.

Clause 38. The non-transitory computer readable medium of clause 35 or any other clause herein, wherein modifying the knowledge graph includes, in response to determining a similarity metric below a predetermined threshold, adding the entity to the knowledge graph.

Clause 39. The non-transitory computer readable medium of clause 35 or any other clause herein, wherein modifying the knowledge graph includes: in response to determining a similarity score above a predetermined threshold, determining that the known entity within the knowledge graph corresponds to the entity associated with the communication artifact; and adjusting one or more statistical weights and/or biases corresponding to the known entity based on the entity and the one or more entity properties associated with the communication artifact.

Clause 40. The non-transitory computer readable medium of clause 35 or any other clause herein, further including instructions that, when read by the processor, cause the processor to perform modifying a representation of the known entity within an ontology corresponding to the knowledge graph to include the one or more entity properties.

Clause 41. A method including: receiving, at a processor, a communication artifact including a user request for a personal recommendation corresponding to a future event; querying a knowledge graph for (1) user preferences corresponding to the user request for the personal recommendation, and (2) data corresponding to the future event; determining parameters corresponding to a preferred recommendation based on the user preferences and the data corresponding to the future event; initiating one or more autonomous computing agents to identify market options filtered according to the user parameters corresponding to the preferred recommendation; receiving a plurality of market options from the one or more autonomous computing agents; determining relevance scores for each of the plurality of market options based on statistical relationships identified between each of the plurality of market options and the parameters corresponding to the preferred recommendation; presenting a particular market option with a highest relevance score to the user as the personal recommendation corresponding to the future event; and initiating an action on behalf of the user based on the personal recommendation.

Clause 42. The method of clause 41 or any other clause herein, wherein the user preferences are stored in a cached layer of the knowledge graph.

Clause 43. The method of clause 42 or any other clause herein, wherein initiating the action on behalf of the user includes transmitting an application programming interface (API) call to a third-party platform with parameters corresponding to the personal recommendation.

Clause 44. The method of clause 43 or any other clause herein, further including modifying statistical weights corresponding to the user preferences stored in the cached layer in response to initiating the action on behalf of the user.

Clause 45. The method of clause 41 or any other clause herein, wherein the user preferences within the knowledge graph correspond to inferences based on a plurality of communication artifacts received from a plurality of third-party applications.

Clause 46. The method of clause 41 or any other clause herein, further including processing text data from the user request via one or more large language models (LLMs), wherein the one or more LLMs are operatively configured to perform natural language processing to determine an intention corresponding to the user request.

Clause 47. The method of clause 46 or any other clause herein, wherein determining the parameters corresponding to the preferred recommendation further includes initiating a knowledge graph query expansion based on the intention corresponding to the user request.

Clause 48. A system including: a processor; and a memory on which are stored machine-readable instructions that when executed by the processor, cause the processor to: receive, at a processor, a communication artifact including a user request for a personal recommendation corresponding to a future event; query a knowledge graph for (1) user preferences corresponding to the user request for the personal recommendation, and (2) data corresponding to the future event; determine parameters corresponding to a preferred recommendation based on the user preferences and the data corresponding to the future event; initiate one or more autonomous computing agents to identify market options filtered according to the user parameters corresponding to the preferred recommendation; receive a plurality of market options from the one or more autonomous computing agents; determine relevance scores for each of the plurality of market options based on statistical relationships identified between each of the plurality of market options and the parameters corresponding to the preferred recommendation; present a particular market option with a highest relevance score to the user as the personal recommendation corresponding to the future event; and initiate an action on behalf of the user based on the personal recommendation.

Clause 49. The system of clause 48 or any other clause herein, wherein the user preferences are stored in a cached layer of the knowledge graph.

Clause 50. The system of clause 49 or any other clause herein, wherein initiating the action on behalf of the user includes transmitting an application programming interface (API) call to a third-party platform with parameters corresponding to the personal recommendation.

Clause 51. The system of clause 50 or any other clause herein, wherein the processor is further caused to modify statistical weights corresponding to the user preferences stored in the cached layer in response to initiating the action on behalf of the user.

Clause 52. The system of clause 48 or any other clause herein, wherein the user preferences within the knowledge graph correspond to inferences based on a plurality of communication artifacts received from a plurality of third-party applications.

Clause 53. The system of clause 48 or any other clause herein, wherein the processor is further caused to process text data from the user request via one or more large language models (LLMs), wherein the one or more LLMs are operatively configured to perform natural language processing to determine an intention corresponding to the user request.

Clause 54. The system of clause 53 or any other clause herein, wherein determining the parameters corresponding to the preferred recommendation further includes initiating a knowledge graph query expansion based on the intention corresponding to the user request.

Clause 55. A non-transitory computer readable medium including instructions, that when read by a processor, cause the processor to perform: receiving, at a processor, a communication artifact including a user request for a personal recommendation corresponding to a future event; querying a knowledge graph for (1) user preferences corresponding to the user request for the personal recommendation, and (2) data corresponding to the future event; determining parameters corresponding to a preferred recommendation based on the user preferences and the data corresponding to the future event; initiating one or more autonomous computing agents to identify market options filtered according to the user parameters corresponding to the preferred recommendation; receiving a plurality of market options from the one or more autonomous computing agents; determining relevance scores for each of the plurality of market options based on statistical relationships identified between each of the plurality of market options and the parameters corresponding to the preferred recommendation; presenting a particular market option with a highest relevance score to the user as the personal recommendation corresponding to the future event; and initiating an action on behalf of the user based on the personal recommendation.

Clause 56. The non-transitory computer readable medium of clause 55, wherein the user preferences are stored in a cached layer of the knowledge graph.

Clause 57. The non-transitory computer readable medium of clause 56, wherein initiating the action on behalf of the user includes transmitting an application programming interface (API) call to a third-party platform with parameters corresponding to the personal recommendation.

Clause 58. The non-transitory computer readable medium of clause 57, further including instructions that, when read by the processor, cause the processor to perform modifying statistical weights corresponding to the user preferences stored in the cached layer in response to initiating the action on behalf of the user.

Clause 59. The non-transitory computer readable medium of clause 55, wherein the user preferences within the knowledge graph correspond to inferences based on a plurality of communication artifacts received from a plurality of third-party applications.

Clause 60. The non-transitory computer readable medium of clause 55, further including instructions that, when read by the processor, further cause the processor to process text data from the user request via one or more large language models (LLMs), wherein the one or more LLMs are operatively configured to perform natural language processing to determine an intention corresponding to the user request.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A method comprising:
receiving, at a processor, a communication artifact from a data source operatively connected to the processor, wherein the communication artifact comprises text data directed towards a user;
extracting the text data from the communication artifact;
processing the text data to determine a semantic meaning of the text data, the semantic meaning comprising an intention of the text data;
querying a knowledge graph corresponding to the user for an ontology comprising representations of a plurality of entities and a plurality of properties corresponding to each of the plurality of entities;
processing the ontology to determine one or more properties of one or more entities from the plurality of properties corresponding to the plurality of entities associated with the intention of the text data;
generating a knowledge graph lookup query comprising a request for entity data from the plurality of entities stored in the knowledge graph corresponding to the user, wherein the knowledge graph lookup query comprises one or more parameters based on the intention of the text data;
receiving the entity data from the knowledge graph;
processing the entity data to determine a contextual meaning of the text data, wherein processing the entity data comprises determining one or more statistical relationships between the text data and the entity data; and
initiating an action on behalf of the user based on the contextual meaning of the text data.

2. The method of claim 1, wherein processing the text data to determine the intention and the semantic meaning of the text data comprises processing the text data via one or more large language models operatively configured to perform natural language processing.

3. The method of claim 1, wherein the one or more parameters of the knowledge graph lookup query comprises the one or more entities comprising the one or more properties associated with the intention of the text data.

4. The method of claim 1, wherein determining that the one or more properties of one or more entities are associated with the intention of the text data comprises determining a statistical relationship between the one or more properties of one or more entities and the intention of the text data.

5. The method of claim 4, wherein determining the statistical relationship comprises further determining that one or more statistical weights and/or biases corresponding to the entity data within the knowledge graph exceed a predetermined threshold.

6. A system comprising:
a processor; and
a memory on which are stored machine-readable instructions that when executed by the processor, cause the processor to:
receive, at a processor, a communication artifact from a data source operatively connected to the processor, wherein the communication artifact comprises text data directed towards a user;
extract the text data from the communication artifact;
process the text data to determine a semantic meaning of the text data, the semantic meaning comprising an intention of the text data;
query a knowledge graph corresponding to the user for an ontology comprising representations of a plurality of entities and a plurality of properties corresponding to each of the plurality of entities;
process the ontology to determine one or more properties of one or more entities from the plurality of properties corresponding to the plurality of entities associated with the intention of the text data;
generate a knowledge graph lookup query comprising a request for entity data from the plurality of entities stored in the knowledge graph corresponding to the user, wherein the knowledge graph lookup query comprises one or more parameters based on the intention of the text data;

receive the entity data from the knowledge graph;

process the entity data to determine a contextual meaning of the text data, wherein processing the entity data comprises determining one or more statistical relationships between the text data and the entity data; and initiate an action on behalf of the user based on the contextual meaning of the text data.

7. The system of claim 6, wherein processing the text data to determine the intention and the semantic meaning of the text data comprises processing the text data via one or more large language models operatively configured to perform natural language processing.

8. The system of claim 6, wherein the one or more parameters of the knowledge graph lookup query comprises the one or more entities comprising the one or more properties associated with the intention of the text data.

9. The system of claim 6, wherein determining that the one or more properties of one or more entities are associated with the intention of the text data comprises determining a statistical relationship between the one or more properties of one or more entities and the intention of the text data.

10. The system of claim 9, wherein determining the statistical relationship comprises further determining that one or more statistical weights and/or biases corresponding to the entity data within the knowledge graph exceed a predetermined threshold.

11. A non-transitory computer readable medium comprising instructions, that when read by a processor, cause the processor to perform:

receiving, at the processor, a communication artifact from a data source operatively connected to the processor, wherein the communication artifact comprises text data directed towards a user;

extracting the text data from the communication artifact;

processing the text data to determine a semantic meaning of the text data, the semantic meaning comprising an intention of the text data;

querying a knowledge graph corresponding to the user for an ontology comprising representations of a plurality of entities and a plurality of properties corresponding to each of the plurality of entities;

processing the ontology to determine one or more properties of one or more entities from the plurality of properties corresponding to the plurality of entities associated with the intention of the text data;

generating a knowledge graph lookup query comprising a request for entity data from the plurality of entities stored in the knowledge graph corresponding to the user, wherein the knowledge graph lookup query comprises one or more parameters based on the intention of the text data;

receiving the entity data from the knowledge graph;

processing the entity data to determine a contextual meaning of the text data, wherein processing the entity data comprises determining one or more statistical relationships between the text data and the entity data; and initiating an action on behalf of the user based on the contextual meaning of the text data.

12. The non-transitory computer readable medium of claim 11, wherein processing the text data to determine the intention and the semantic meaning of the text data comprises processing the text data via one or more large language models operatively configured to perform natural language processing.

13. The non-transitory computer readable medium of claim 11, wherein the one or more parameters of the knowledge graph lookup query comprises the one or more entities comprising the one or more properties associated with the intention of the text data.

14. The non-transitory computer readable medium of claim 11, wherein determining that the one or more properties of one or more entities are associated with the intention of the text data comprises determining a statistical relationship between the one or more properties of one or more entities and the intention of the text data, and wherein determining the statistical relationship comprises further determining that one or more statistical weights and/or biases corresponding to the entity data within the knowledge graph exceed a predetermined threshold.

\* \* \* \* \*